United States Patent
Dekel et al.

(10) Patent No.: US 6,314,452 B1
(45) Date of Patent: Nov. 6, 2001

(54) SYSTEM AND METHOD FOR TRANSMITTING A DIGITAL IMAGE OVER A COMMUNICATION NETWORK

(75) Inventors: Shai Dekel, Or-Yehuda; Alexander Ovsiankin, Lod, both of (IL)

(73) Assignee: RTImage, Ltd., Or-Vehuda (IL)

( * ) Notice: Subject to any disclaimer, the term of this patent is extended or adjusted under 35 U.S.C. 154(b) by 0 days.

(21) Appl. No.: 09/386,264

(22) Filed: Aug. 31, 1999

(51) Int. Cl.$^7$ ................................................ G06F 13/00
(52) U.S. Cl. ........................................ 709/203; 709/217
(58) Field of Search ................................. 709/201, 203, 709/217, 218, 219, 212, 213, 206, 208

(56) References Cited

U.S. PATENT DOCUMENTS

| | | | |
|---|---|---|---|
| 3,580,655 | 5/1971 | Leith et al. | 359/28 |
| 3,950,103 | 4/1976 | Schmidt-Weinmar | 356/450 |
| 4,136,954 | 1/1979 | Jamieson | 356/456 |
| 4,155,097 | 5/1979 | Lux | 375/240.24 |
| 4,190,861 | 2/1980 | Lux | 382/238 |
| 4,223,354 | 9/1980 | Noble et al. | 348/774 |
| 4,393,456 | 7/1983 | Marshall, Jr. | 708/316 |
| 4,569,075 | 2/1986 | Nussbaumer | 704/203 |
| 4,599,567 | 7/1986 | Goupillaud et al. | 327/105 |
| 4,652,881 | 3/1987 | Lewis | 342/160 |
| 4,663,660 | 5/1987 | Fedele et al. | 375/240.1 |
| 4,674,125 | 6/1987 | Carlson et al. | 382/303 |
| 4,701,006 | 10/1987 | Perlmutter | 359/900 |
| 4,760,563 | 7/1988 | Beylkin | 367/73 |
| 4,785,348 | 11/1988 | Fonsalas et al. | 375/240.21 |
| 4,785,349 | 11/1988 | Keith et al. | 375/240.23 |

(List continued on next page.)

FOREIGN PATENT DOCUMENTS

| | | |
|---|---|---|
| 0510933 | 10/1992 | (EP) . |
| 0593013 | 4/1994 | (EP) . |
| 0611051 | 8/1994 | (EP) . |

(List continued on next page.)

OTHER PUBLICATIONS

Article entitled "High Performance Scalable Image Compression with EBCOT" by David Taubman, submitted to the *IEEE Transactions on Image Processing*, Mar. 1999.

(List continued on next page.)

*Primary Examiner*—Moustafa M. Meky
(74) *Attorney, Agent, or Firm*—Needle & Rosenberg, P.C.

(57) ABSTRACT

The imaging system that is described below is an image streaming system which is different from traditional compression systems. It eliminates the necessity to store a compressed version of the original image, by streaming ROI data using the original stored image. The imaging system of the present invention also avoids the computationally intensive task of compression of the full image. Instead, once a user wishes to interact with a remote image, the imaging server performs a fast preprocessing step in near real time after which it can respond to any ROI requests also in near real time. When a ROI request arrives at the server, a sophisticated progressive image encoding algorithm is performed, but not for the full image. Instead, the encoding algorithm is performed only for the ROI. Since the size of the ROI is bounded by the size and resolution of the viewing device at the client and not by the size of the image, only a small portion of the full progressive coding computation is performed for a local area of the original image. This local property is also true for the client. The client computer performs decoding and rendering only for ROI and not the full image. This real time streaming or Pixels-On-Demand™ architecture requires different approaches even to old ideas. For example, similarly to some prior art, the present imaging system is based on wavelets. But while in other systems wavelet bases are selected according to their coding abilities, the choice of wavelet bases in the present imaging system depends more on their ability to perform well in the real time framework. The system of the present invention supports several modes of progressive transmission: by resolution, by accuracy and by spatial order.

42 Claims, 23 Drawing Sheets

U.S. PATENT DOCUMENTS

| | | | |
|---|---|---|---|
| 4,799,179 | 1/1989 | Masson et al. | 708/313 |
| 4,805,129 | 2/1989 | David | 708/300 |
| 4,815,023 | 3/1989 | Arbeiter | 708/301 |
| 4,817,182 | 3/1989 | Adelson et al. | 382/248 |
| 4,821,223 | 4/1989 | David | 708/308 |
| 4,827,336 | 5/1989 | Acampora et al. | 375/240.01 |
| 4,829,378 | 5/1989 | LeGall | 358/426 |
| 4,837,517 | 6/1989 | Barber | 324/339 |
| 4,839,889 | 6/1989 | Gockler | 370/210 |
| 4,864,398 | 9/1989 | Avis et al. | 348/443 |
| 4,868,868 | 9/1989 | Yazu et al. | 704/205 |
| 4,894,713 | 1/1990 | Delogne et al. | 708/400 |
| 4,897,717 | 1/1990 | Hamilton et al. | 375/240 |
| 4,904,073 | 2/1990 | Lawton et al. | 359/851 |
| 4,922,544 | 5/1990 | Stansfield et al. | 382/166 |
| 4,929,223 | 5/1990 | Walsh | 493/56 |
| 4,936,665 | 6/1990 | Whitney | 359/565 |
| 4,974,187 | 11/1990 | Lawton | 708/420 |
| 4,982,283 | 1/1991 | Acampora | 382/302 |
| 4,985,927 | 1/1991 | Norwood et al. | 382/149 |
| 4,987,480 | 1/1991 | Lippman et al. | 382/253 |
| 4,999,705 | 3/1991 | Puri | 348/412.1 |
| 5,000,183 | 3/1991 | Bonnefous | 600/437 |
| 5,001,764 | 3/1991 | Wood et al. | 382/145 |
| 5,014,134 | 5/1991 | Lawton et al. | 358/426 |
| 5,018,210 | 5/1991 | Merryman et al. | 382/145 |
| 5,049,992 | 9/1991 | Citta et al. | 348/443 |
| 5,049,993 | 9/1991 | LeGall et al. | 348/448 |
| 5,068,911 | 11/1991 | Resnikoff et al. | 382/240 |
| 5,072,308 | 12/1991 | Lin et al. | 358/426 |
| 5,073,964 | 12/1991 | Resnikoff | 382/277 |
| 5,081,645 | 1/1992 | Resnikoff et al. | 375/146 |
| 5,095,447 | 3/1992 | Manns et al. | 382/144 |
| 5,097,331 | 3/1992 | Chen et al. | 375/240.11 |
| 5,101,280 | 3/1992 | Moronaga et al. | 358/426 |
| 5,101,446 | 3/1992 | Resnikoff et al. | 382/248 |
| 5,103,306 | 4/1992 | Weiman et al. | 348/400.1 |
| 5,109,451 | 4/1992 | Aono et al. | 382/166 |
| 5,121,191 | 6/1992 | Cassereau et al. | 348/443 |
| 5,124,930 | 6/1992 | Nicolas et al. | 702/76 |
| 5,128,757 | 7/1992 | Citta et al. | 348/469 |
| 5,128,791 | 7/1992 | LeGall et al. | 348/469 |
| 5,148,498 | 9/1992 | Resnikoff et al. | 382/248 |
| 5,152,953 | 10/1992 | Ackerman | 266/252 |
| 5,156,943 | 10/1992 | Whitney | 430/321 |
| 5,173,880 | 12/1992 | Duren et al. | 367/73 |
| 5,182,645 | 1/1993 | Breeuwer et al. | 348/458 |
| 5,235,434 | 8/1993 | Wober | 358/448 |
| 5,241,395 | 8/1993 | Chen | 358/426 |
| 5,262,958 | 11/1993 | Chui et al. | 702/75 |
| 5,335,016 | 8/1994 | Nakagawa | 8/461 |
| 5,347,479 | 9/1994 | Miyazaki | 708/400 |
| 5,381,145 | 1/1995 | Allen et al. | 341/107 |
| 5,412,741 | 5/1995 | Shapiro | 382/232 |
| 5,420,891 | 5/1995 | Akansu | 375/350 |
| 5,453,945 | 9/1995 | Tucker et al. | 708/400 |
| 5,495,292 | 2/1996 | Zhang et al. | 375/240.02 |
| 5,497,435 | 3/1996 | Berger | 382/249 |
| 5,534,925 | 7/1996 | Zhong | 382/199 |
| 5,537,493 | 7/1996 | Wilkinson | 382/240 |
| 5,546,477 | 8/1996 | Knowles et al. | 382/242 |
| 5,563,690 | 10/1996 | Hasegawa et al. | 399/286 |
| 5,602,589 | 2/1997 | Vishwanath et al. | 382/240 |
| 5,606,359 | * 2/1997 | Youden et al. | 725/88 |
| 5,699,458 | * 12/1997 | Sprague | 382/250 |
| 5,710,835 | 1/1998 | Bradley | 382/233 |
| 5,832,300 | * 11/1998 | Lowthert | 710/33 |
| 5,861,920 | * 1/1999 | Mead et al. | 382/232 |
| 5,886,733 | * 3/1999 | Zdepski et al. | 725/64 |
| 6,038,257 | * 3/2000 | Brusewitz | 375/240.21 |
| 6,049,342 | * 4/2000 | Nielsen et al. | 345/473 |
| 6,049,821 | 4/2000 | Therialut et al. | 709/203 |

FOREIGN PATENT DOCUMENTS

| | | |
|---|---|---|
| 0622741 | 11/1994 | (EP) . |
| 0701375 | 3/1996 | (EP) . |
| 2211691 | 7/1991 | (GB) . |
| 2284121 | 5/1995 | (GB) . |
| 2285374 | 6/1995 | (GB) . |
| WO 88/10049 | 12/1988 | (WO) . |
| WO 91/03902 | 3/1991 | (WO) . |
| WO 91/18361 | 11/1991 | (WO) . |
| WO 94/23385 | 10/1994 | (WO) . |
| WO 95/19683 | 7/1995 | (WO) . |
| WO 96/09718 | 3/1996 | (WO) . |
| WO 97/30551 | * 8/1997 | (WO) . |

OTHER PUBLICATIONS

Article entitled "Image Compression technology: For the Decade Ahead, Wavelet Soars!" by Lee J. Nelson, published in *Advanced Imaging*.

Article entitled "Overcoming Bandwidth Limitations: Professional Image Sharing" by Paul Worthington, published in *The Future Image*™™ *Report*. vol. 5, Issue 10, 1998.

Article entitled "Handling High–Performance Web Images for E–Commerce: Live Picture Meets Oracle" by Lee J. Nelson, published in *Advanced Imaging*, Jan., 1999.

Advertising brochure for "Mr. SID" by Lizardteck Inc., copyright 1999.

Article entitled "Is it Safe" by Michael J. Cannavo, published in *Imaging Economics*, Jan.–Feb., 1999.

Article entitled "RSNA vendor showcase wealth of Web–based teleradiology" by Michael J. Cannavo, published in *Telehealth Magazine*, Feb., 1999.

Article entitled "Revolutionary protocol speeds electronic Image delivery" by John C. Hayes, published in *News Uplink*, Feb., 1999.

* cited by examiner

```
zeroModel_16 . start_model ( ) ;
zeroModel_4 . start_model ( ) ;
zeroCoefModel . start_model ( ) ;
coefSignModel . start_model ( ) ;

while (encoder.getNextGroupOf15 ( ) ) { bool isZero;

if (encoder.isGroupType16 ( ) ) {
    isZero = encoder.isZeroGroupOf16 ( ) ;
    arithmetic_encode_symbol (ZeroModel_16, isZero) ;
    if (isZero)
      continue;
  } while (encoder.getNextGroupOf4 ( ) ) {
    if (encoder.isGroupType4 ( ) ) {
      if (! encoder.mustbeNoZeroGroup ( ) ) {
        isZero = encoder.isZeroGroupOf4 ( ) ;
        arithmetic_encode_symbol (ZeroModel_4, isZero) ;
        if (isZero)
          continue;
      }
    } while (encoder.getNext_Type1_Coef (isZero) ) {
      if (!encoder.mustbeNoZeroCoef ( ) )
        arithmetic_encode_symbol (zeroCoefModel, isZero) ;
      if (! isZero)
        arithmetic_encode_symbol (coefSignModel, encoder:getCoefSign ( ) ) ;
    }
  } if (! (encoder.isLastBitPlane ( ) && equalBinSetting) )
    bitModel.start_model ( ) ;

int bit;

while (encoder.getNextSubordinatePassBit (bit) )
    arithmetic_encode_symbol (bitmodel, bit) ;
  }
}
```

FIG.4

```
zeroModel_16 . start_model ( ) ;
zeroModel_4 . start_model ( ) ;
zeroCoefModel . start_model ( ) ;
coefSignModel . start_model ( );

while (decoder.getNextGroupOf16 ( ) ) { if (decoder.isGroupType16 ( ) ) {
    if (arithmetic_decode_symbol (zeroModel_16) ) {
      decoder . zeroGroupOf16 ( ) ;
      continue;
     }
   else
     decoder . removeZeroGroupOf16 ( ) ;
  } while (decoder.getNextGroupOf4 ( ) ) {
    if (decoder.isGroupType4 ( ) ) {
      if (! decoder.mustbeNotZeroGroup ( ) ) {
       if (arithmetic_decode_symbol (zeroModel_4) ) {
         decoder . zeroGroupof4 ( ) ;
         continue;
        }
      }
      decoder . removeZeroGroupof4 ( ) ;
    }
     while (decoder.getNext_Type1_Coef ( ) ) {
       if (decoder.mustbeNotZeroCoef ( ) )
         decoder . setNextSigCoef (arithmetic_decode_symbol (coefSignModel) ) ;
       else if (! arithmetic_decode_symbol (zeroCoefModel) )
         decoder . setNextSigCoef (arithmetic_decode_symbol (coefSignModel) ) ;
     }
   }
 } if (! (decoder.isLastBitPlane ( ) && equalBinSetting) ) {
  bitModel . start_model ( ) ;
  while (decoder.moreSignificantCoef ( ) }
     decoder . setSignificantCoefbit (arithmetic_decode_symbol (bitModel) );
}
```

FIG. 15

```
for (int j=0 ; j<2^(numberOfResolution=jumpSize) ; j++) { for (int t_Resolution = numberOfResolutions - jumpSize , t_y=j ;
         t_y≥0 && t_Resolution ≥1 ;
         t_Resolution--, t_y=t_y/2-1) { if (t_y<nTileY(t_Resolution)) { for (int t_x=0 ; t_x<nTileX(t_Resolution) ; t_x++ )
                preprocessSubbandTile ( t_x,t_y,t_Resolution) ;

}
        if ( t_y (mod2)=1)
            break;
    }
}
```

FIG. 19

```
RecursiveRenderingMarch (int t_resolution, int t_y ) { if (t_y < highest_y( t_resolution) )
        getCoefficientsOfTileRow(t_resolution, t_y);

if (t_y > lowest_y( t_resolution) )
        InverseSubbandTransformTileRow(t_resolution, t_y);

if (t_y > lowest_y( t_resolution) && t_resolution != dyadicResolution(ROI) ) { int y = jy - 1;
        if (2xt_y ≥ lowest_y( t_resolution+1) &&
            2xt_y < highest_y( t_resolution+1) )

RecursiveRenderingMarch (t_resolution+1, 2xt_y);

if (2xt_y+1 ≥ lowest_y( t_resolution+1) &&
            2xt_y+1 < highest_y( t_resolution+1) )

RecursiveRenderingMarch (t_resolution+1, 2xt_y+1);

if (2xt_y+2 < highest_y( t_resolution+1)
            RecursiveRenderingMarch (t_resolution+1, 2xt_y+2);
    }
}
```

FIG. 23

SYSTEM AND METHOD FOR TRANSMITTING A DIGITAL IMAGE OVER A COMMUNICATION NETWORK

BACKGROUND OF THE INVENTION

1. Field of the Invention

This invention relates to systems and methods for transmission of still images over relatively low-speed communication channels. More specifically the invention relates to progressive image streaming over low speed communication lines, and may be applied to a variety of fields and disciplines, including commercial printing, medical imaging, among others.

2. Brief Description of the Prior Art

In a narrow bandwidth environment, a simple transfer to a client computer of any original image stored in a server's storage is obviously time consuming. In many cases the user only wishes to view a low resolution of the image and perhaps a few more high resolution details, and so a full image transfer is inefficient. This problem can be overcome by storing images in some compressed formats. Examples for such formats are standards such as Progressive JPEG, FlashPix, the upcoming JPEG2000, and some recent proprietary so-called wavelet formats. Some of these formats allow progressive transmission (of the full image) and some allow transmission of only region of interest (ROI) data, thereby avoiding the necessity to transmit the entire image before it can be rendered at the client side.

But there are at least three main problems with the existing solutions: first, one needs to prepare and store a compressed image of this type for any original image located in the storage. In many cases this results in storing both the original image and the compressed version. Sometimes the size of the file prepared for transmission is even larger than the original file. For example, a lossless FlashPix representation of a given image is typically 4/3 the size of the original image. Secondly, the computation of any of the above formats is much more intensive than regular compression techniques such as the base-line version of JPEG. The last problem is that the existing methods generally do not support efficient extraction and transmission of ROI data, but rather the whole image in progressive mode. The FlashPix format that does support ROI streaming is not a wavelet-based format and therefore cannot take advantage (as wavelets do) of the relations between the various resolutions of the image.

The above-mentioned problems with the prior art result in inefficient systems both in architecture and data handling workflows. This tends to be the case for imaging applications such as in the graphics arts and medical environments, where image files are relatively large and they are created dynamically as external events dictate.

SUMMARY OF THE INVENTION

The imaging system that is described below is an image streaming system which is different from traditional compression systems and overcomes the above problems. It eliminates the necessity to store a compressed version of the original image, by streaming ROI data using the original stored image. The imaging system of the present invention also avoids the computationally intensive task of compression of the fall image. Instead, once a user wishes to interact with a remote image, the imaging server performs a fast preprocessing step in near real time after which it can respond to any ROI requests also in near real time. When a ROI request arrives at the server, a sophisticated progressive image encoding algorithm is performed, but not for the full image. Instead, the encoding algorithm is performed only for the ROI. Since the size of the ROI is bounded by the size and resolution of the viewing device at the client and not by the size of the image, only a small portion of the full progressive coding computation is performed for a local area of the original image. This local property is also true for the client. The client computer performs decoding and rendering only for ROI and not the full image. This real time streaming or Pixels-On-Demand™ architecture requires different approaches even to old ideas. For example, similarly to some prior art, the present imaging system is based on wavelets. But while in other systems wavelet bases are selected according to their coding abilities, the choice of wavelet bases in the present imaging system depends more on their ability to perform well in the real time framework. The system of the present invention supports several modes of progressive transmission: by resolution, by accuracy and by spatial order.

BRIEF DESCRIPTION OF THE DRAWINGS

FIG. 4 is sample pseudo-code describing a bit plane scan process, forming a part of an encoding process.

FIG. 15 is sample pseudo-code describing the bit plane scan of the client decoding algorithm.

FIG. 19 is sample pseudo-code describing memory constraint subband tile preprocessing as part of the preprocessing algorithm.

FIG. 23 is sample pseudo-code describing the recursive multiresolution march in the client progressive rendering process.

DETAILED DESCRIPTION OF THE INVENTION

1. Notation and Terminology

The following notation of Table 1 is used throughout this document.

TABLE 1

| Notation | Definition |
|---|---|
| 4D | Four dimensional |
| DCT | Discrete Cosine Transform |
| FIR | Finite Impulse Response |
| FWT | Forward Wavelet Transform |
| GUI | Graphical User Interface |
| ID | Identification tag |
| IWT | Inverse Wavelet Transform |
| ROI | Region Of Interest |
| URL | Uniform Resource Locator |

The following terminology and definitions of Table 2 apply throughout this document.

TABLE 2

| Term | Definition |
|---|---|
| Rendering | Procedure to output/display a region of interest (ROI) of an image to a device such as a monitor, printer, etc. |
| Multi-resolution | A pyramidal structure representing an image at dyadic resolutions, beginning with the original image as the highest resolution. |
| Subband Transform/ subband coefficients | A method of decomposing an image (time domain) to frequency components (frequency domain). A representation of an image as a sum of differences between the dyadic resolutions of the image's multiresolution. |
| Wavelet Transform/ Wavelet coefficients | A special case of Subband Transform. |
| Quantization | A process that, given a number, removes some precision from it, such that it will be possible to code it in lower precision using less bits of memory |
| Threshold | A process that, using a given positive constant, sets to zero any number whose absolute value is below the constant. |
| Progressive Transmission | Transmitting a given image in successive steps, where each step adds more detail to the rendering of the image |
| Progressive Rendering | A sequence of rendering operations, each adding more detail. |
| Progressive by accuracy | Transmit/render strong features first (sharp edges), less significant features (texture) last |
| Progressive by resolution | Transmit/render low resolution first, high resolution last |
| Progressive by spatial order | Transmit/render top of image first, bottom of image last |
| Distributed database | A database architecture that can be used in a network environment |
| Subband/ Wavelet tile | A group of subband/wavelet coefficients corresponding to a time-frequency localization at some given spatial location and resolution/frequency |
| Subband/ Wavelet data block | An encoded portion of a subband/wavelet tile that corresponds to some accuracy layer |

2. Overview of the Invention

Figure 1:
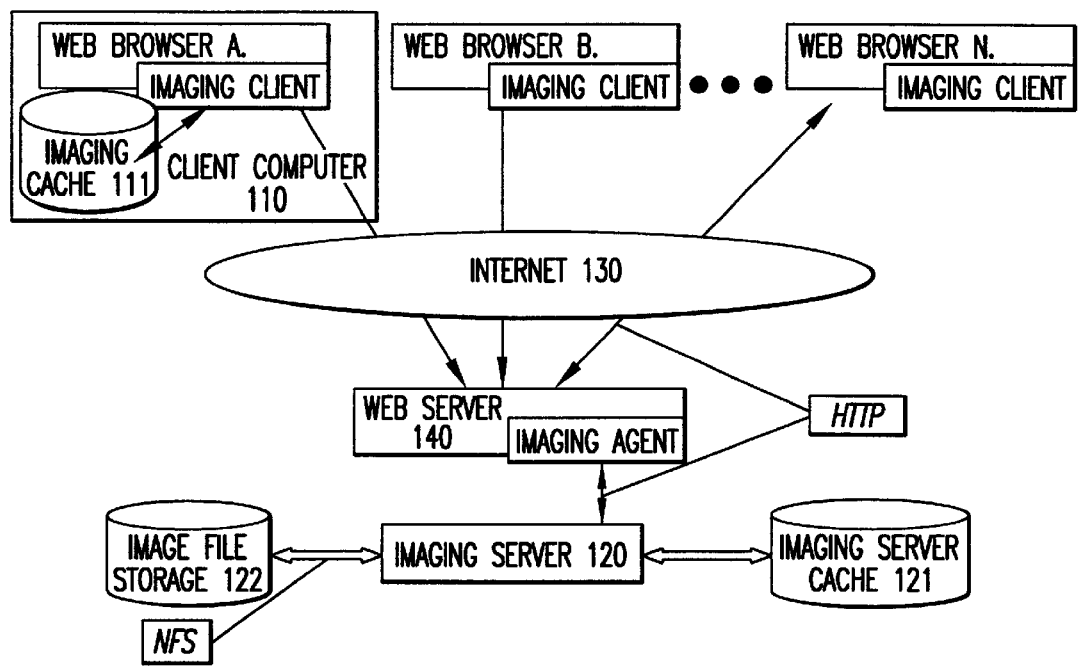
FIG. 1 is an overall system architecture block diagram for the present invention, in one embodiment.

Referring to FIG. 1, a block diagram is provided depicting the various components of the imaging system in one embodiment. A client computer 110 is coupled to a server computer 120 through a communication network 130.

In one embodiment, the client computer 110 and server computer 120 may comprise a PC-type computer operating with a Pentium-class microprocessor, or equivalent. Each of the computers 110 and 120 may include a cache 111, 121 respectively as part of its memory. The server may include a suitable storage device 122, such as a high-capacity disk, CD-ROM, DVD, or the like.

The client computer 110 and server computer 120 may be connected to each other, and to other computers, through a communication network 130, which may be the Internet, an Intranet (e.g., a local area network), a wide-area network, a wireless network, or the like. Those having ordinary skill in the art will recognize that any of a variety of communication networks may be used to implement the present invention.

Figure 2:
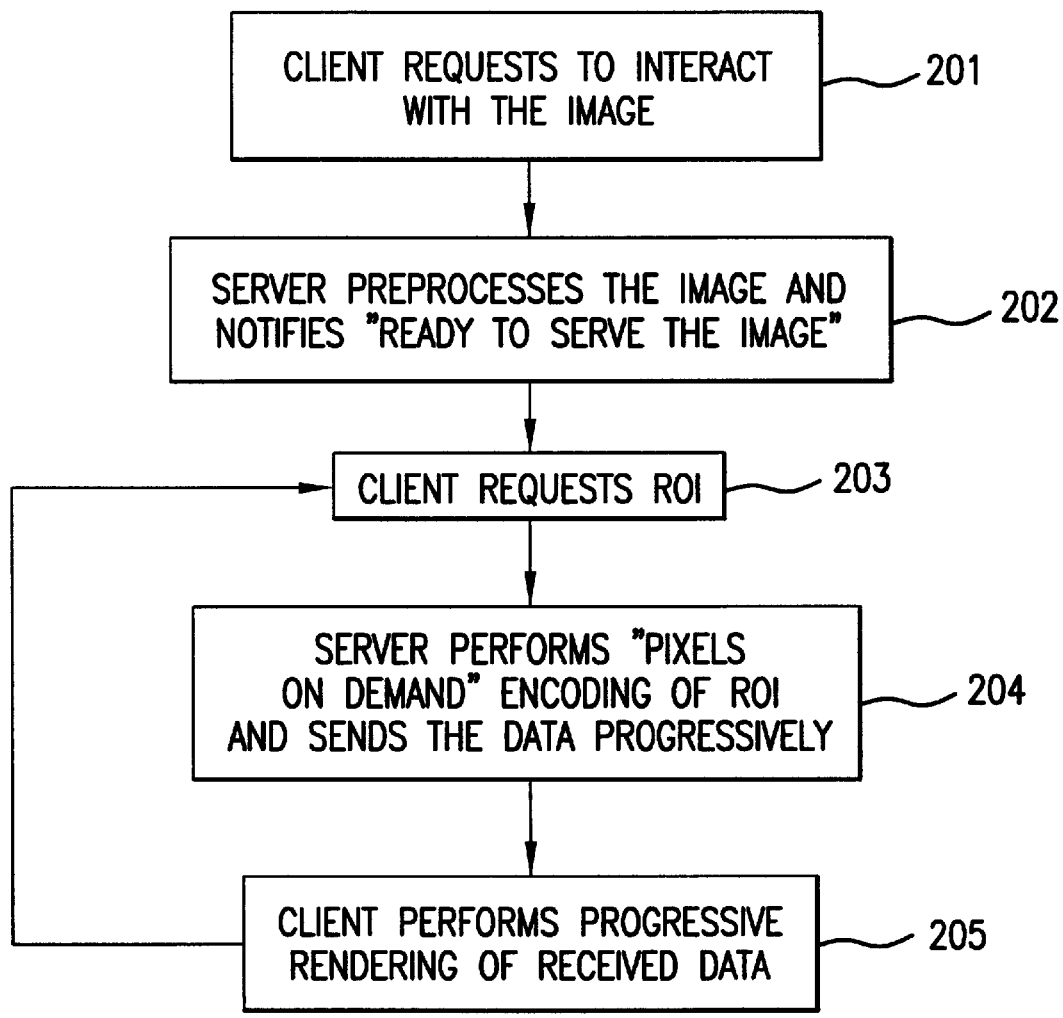
FIG. 2 is an overall system workflow diagram for the present invention, in one embodiment.

With reference to FIG. 2, the overall system workflow is described. In one embodiment, using any browser type application, the user of the client computer 110 connects to a Web Server 140 or directly to the Imaging server 120 as described in FIG. 1. In step 201, the user then selects, using common browser tools, an image residing on the image file storage device 122. The corresponding URL request is received and processed by the imaging server 120. In the case where the results of previous computations on the image are not present in the imaging cache 121, the server 120 performs a fast preprocessing algorithm (described in further detail later in section 6.1). The result of this computation is inserted into the cache 121.

Unlike other more traditional applications or methods which perform fill progressive encoding of the image in an offline type manner, the goal of the preprocessing step 202 is to allow the server 120, after a relatively fast computational step, to serve any ROI specified by the user of the client computer 110. For example, for a 75M RGB (color) image, using the server 120 of the present invention, installed on a computer with a Pentium processor, fast disk 122, running Windows NT, the preprocessing step 202 will typically take 5 seconds or less. This is by order of magnitude faster than a full compression algorithm such as is described in the prior art, such as in J. M. Shapiro, "An embedded hierarchical image coder using zero-trees of wavelet coefficients", IEEE Trans. Sig. Proc., Vol. 41, No. 12, pp. 3445–3462, 1993; A. Said and W. Pearlman, "A new, fast and efficient image codec based on set partitioning", IEEE Trans. Circuits and Systems for video Tech., Vol. 6, No. 3, pp. 243–250, 1996; or D. Taubman, "High performance scalable image compression with EBCOT", preprint, 1999.

Serving a ROI is described herein as Pixels-On-Demand™, which identifies a progressive transmission of any ROI of the image essentially in real-time, where the quality of the view improves with the transfer rate. Once the preprocessing stage is done in step 202, the server 120 sends to the client 110 a notification that the image is ready to be served. The server 120 also transmits the basic parameters associated with the image such as dimensions, color space, etc. Upon receiving this notification, the client 110 can select any ROI of the image using a standard graphical user interface.

The ROI is formulated in step 203 by the client 110 into a request list that is sent to the server 120. Each such request corresponds to a data block (described later in further detail in section 3). The order of requests in the list corresponds to a progressive mode selected in the context of the application, such as progressive by accuracy rendering of the ROI. Upon receiving the ROI request list, the server 120 processes the requests according to their order. For each such request the server 120 checks if the corresponding data block already exists in the cache 121. If not, the server 120 then computes the data block, stores it in the cache 121 and immediately sends it to the client 110. Once a data block that was requested arrives at the client 110, it is inserted into the cache 111. At various points in time during the transfer process, a decision rule invokes a rendering of the ROI by the client 110.

If some of the data blocks required for a high quality rendering of the ROI were requested from the server 120, but have not arrived yet at the client 110, the rendering of the ROI will be of lower quality. But, due to the progressive request order, the rendering quality will improve with each received data block in an optimal way. In case the user changes the ROI, the rendering task at the client 110 is canceled and a new request list corresponding to a new ROI, sent from the client 110 to the server 120, will notify the server 120 to terminate the previous computation and transmission task and begin the new one.

3. Imaging Protocol and Distributed Data-base

The imaging protocol serves as a common language between the server 120 and its clients 110, and is mainly used for the following purposes:

1. By the client 110 to efficiently stream to the server an ordered request list of data blocks required for progressive rendering of a given ROI.
2. By the server 120 to efficiently compose and send to the client 110 a stream of (requested) data blocks.

Both client 110 and server 120 use the same distributed database associated with the protocol, such that they are using the same tagging system for the various data blocks. Using this approach it is also possible to cache the data blocks at both ends.

The server 120 is able to cache (in cache 121) any computed data block, such that this data block can be sent to any other client 110 that requests it. The client 110 is able to cache (in cache 111) any data block received, such that for any subsequent ROI rendering operation requiring the data block, it will be extracted from the client cache 111 and not ordered from the server 120. The protocol is designed such that the imaging system will have efficient ROI control and rendering in any mode such as: progressive by accuracy, progressive by resolution and progressive by spatial order.

The basic components of the protocol are accuracy layers associated with tiles of subband/wavelet coefficients. To illustrate, suppose I(x,y) is a given single component image such as a grayscale image. It will later be shown how the protocol is generalized to arbitrary color spaces. Let FWT(I) (Forward Wavelet Transform) be a subband/wavelet transform of the image. For references describing such transforms, see the basic introductions contained in C. K. Chui, "An introduction to wavelets", Academic Press, 1992; I. Daubechies, "Ten lectures on wavelets", Siam, 1992; and S. Mallat, "A wavelet tour of signal processing", Academic Press, 1998.

Figure 3:
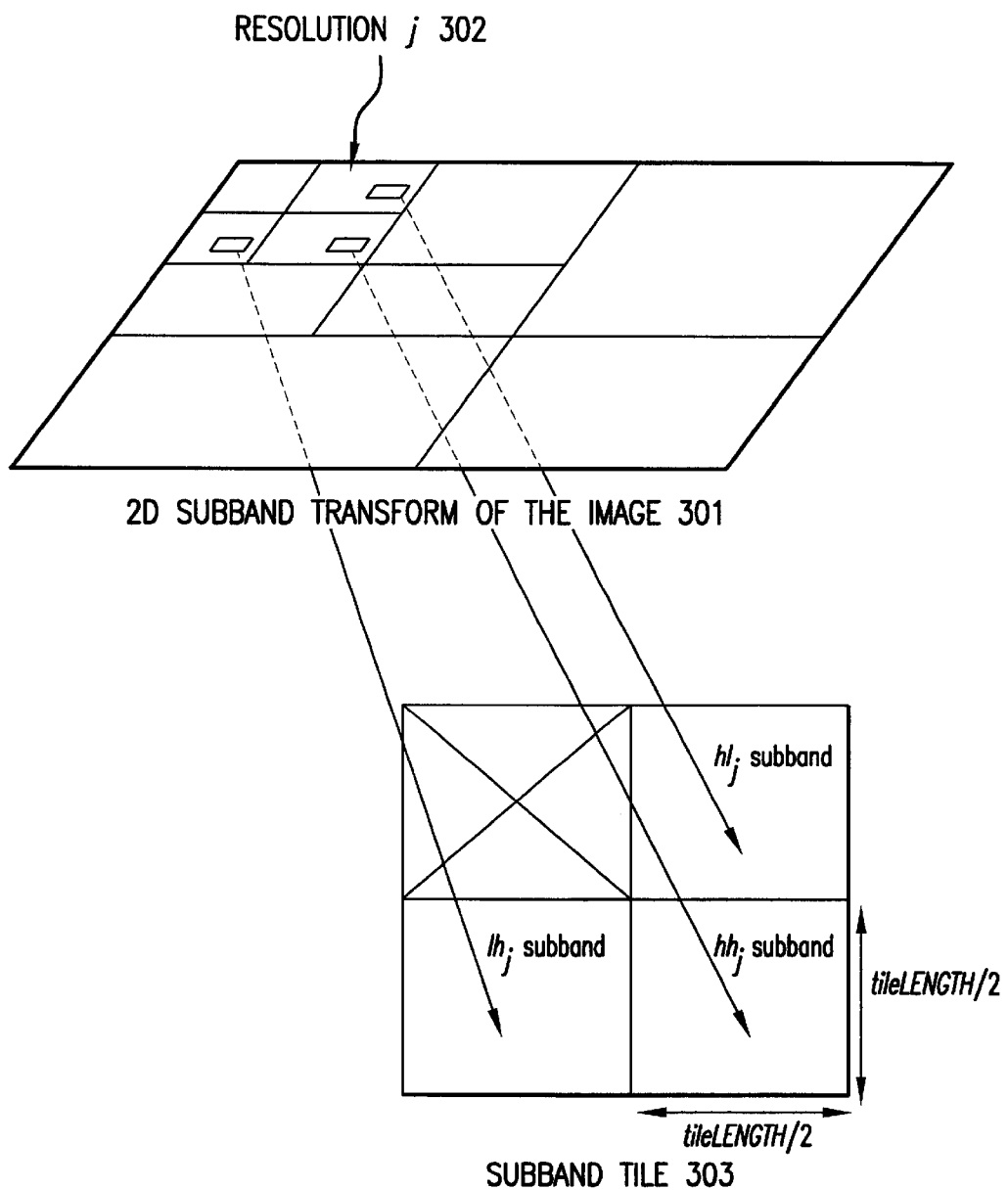
FIG. 3 depicts, for a subband tile, spatial grouping of subband coefficients at a given resolution.

As described herein, we require that the transform will be separable. A 2D separable transform can be computed by two 1D steps: in the X direction and then in the Y direction of the given image. As can be seen in FIG. 3, the transform typically creates for each given resolution/frequency j three subbands denoted as $hl_j$, $lh_j$, $hh_j$. Thus, we can associate the coefficients of FWT(I) to the structure 301. Observe that each coefficient belongs to a certain resolution 302. Also, if a Finite Impulse Response (FIR) subband filter (compactly supported wavelet) is used, each coefficient influences only a compactly supported region of the image. High resolution/frequency coefficients are associated with a small region and low resolution/frequency coefficients are associated with a larger region.

For the purpose of efficient rendering the coefficients may be subdivided into the tiles 303. Into each tile we group three subgroups of coefficients corresponding to subbands $hl_j$, $lh_j$, $hh_j$ at the resolution j, associated with the same spatial area. Typically the sub-tiles are chosen to have a length of 32, so that the tile contains $3 \times 32^2$ coefficients. This relates to the fact that at the time of rendering at the client 110, the subband tile will provide a means to render a tile of length 64. A parameter tileLength controls the length of the subband tiles 303 and can be changed dynamically per image. To each such tile 303 we associate a 3D coordinate $$(t\_x, t\_y, t\_resolution) \quad (1.1)$$

Note that:

1. The Discrete Cosine Transform (DCT) transform used in the standard JPEG [PM1] is certainly a FIR separable subband transform, but of a slightly different nature than wavelets. Using the common 8×8 DCT as in JPEG limits the number of possible resolutions to four. Also the DCT coefficients are not traditionally associated with resolutions or with any of the three subband types hl, lh, hh . Nevertheless it is possible to do so (see Z. Xiong, O. Guleryuz and T. Orchard, "A DCT-based embedded image coder", IEEE Signal Proc. Letters, November 1996) and the present imaging protocol supports the DCT by grouping the coefficients into such a tiled structure.

2. To generalize the above for more than one image component, simply associate with the tile the coordinates described above as (1.1) all the coefficients corresponding to the same spatial location of all the components. Thus, $3 \times 32^2 \times \text{numberOfComponents}$ coefficients are associated with a multidimensional tile.

How the subband tiles are further decomposed to subband data blocks will now be further explained. The motivation for this finer 4D decomposition is this: Each subband tile at the resolution j participates in the rendering of local regions in all the resolutions $\geq j$. Assume j corresponds to a very low resolution. It turns out that for a high quality rendering of a given ROI at the resolution j, only the coefficients with high absolute value are required. Transmitting small coefficients will not have any significant visual effect at the time of rendering, and thus should be avoided. Also, transmitted coefficients need not be sent at a high precision since this also will have visual significance to the rendering operation. Rather, for each such significant coefficient only a few bits of precision should be transmitted along with the coefficient's sign. Rendering the same ROI at a higher quality or rendering a higher resolution will require sending of more of the tile's coefficients and also more accuracy bits for the coefficients that were already sent. For this reason, each subband tile is further decomposed into accuracy data blocks. Each data block is associated with the "bit plane" interval [0,2) at level 0, or the intervals $[2^l, 2^{l+1})$ at level $l \geq 1$.

Figure 5:
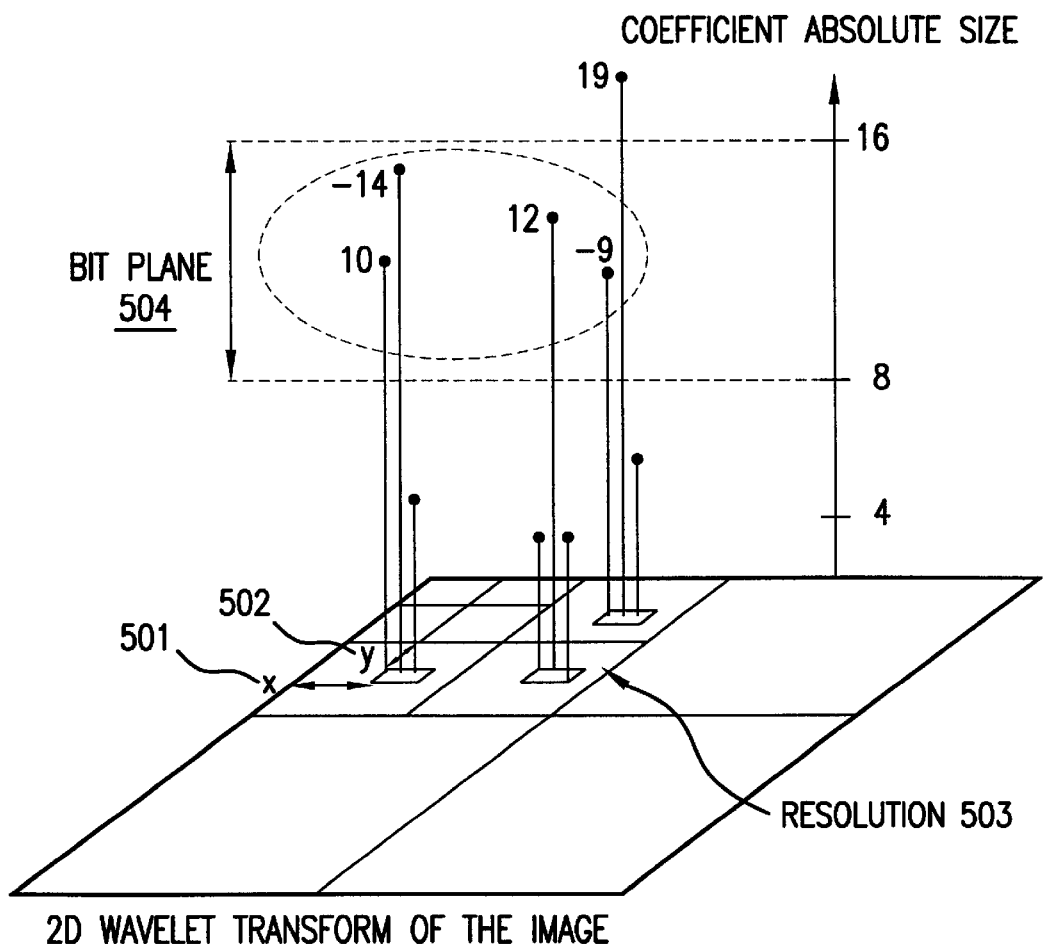
FIG. 5 depicts the visualization of a data block having x,y, resolution and bit plane dimensions.

As illustrated in FIG. 5, each data block of the subband tile (1.1) will have a 4D coordinate $$(t\_x, t\_y, t\_resolution, t\_bitplane) \quad (1.2)$$

where $0 \leq t\_bitplane \leq \text{maxBitPlane}(t\_resolution)$. x,y, resolution and bit plane are depicted in FIG. 5 as reference numerals 501, 502, 503 and 504, respectively. The value of maxBitPlane(t_resolution) corresponds to some predetermined constant or is selected dynamically according to the largest coefficient at the resolution t_resolution of the given image. For example, maxBitPlane(t_resolution)=8 seems to work well on most images. Adapting the well known bit plane technique described in J. M. Shapiro, "An embedded hierarchical image coder using zero-trees of wavelet coefficients", IEEE Trans. Sig. Proc., Vol. 41, No. 12, pp. 3445–3462, 1993; and A. Said and W. Pearlman, "A new, fast and efficient image codec based on set partitioning", IEEE Trans. Circuits and Systems for video Tech., Vol. 6, No. 3, pp. 243–250, 1996, a data block having the coordinates described above at (1.2) contains the following data in encoded format:

1. For t_bitPlane>0, a "list" of the indices of all subband coefficients whose absolute value is in the range $[2^{t\_bitPlane}, 2^{t\_bitPlane+1})$.
2. The sign of all the coefficients of 1.
3. In some cases an addition al precision bit is added for any coefficient that belongs to the current bit plane or any higher bit plane.

It may be noted that:

1. In case the subband tile has coefficients whose absolute value $\geq 2^{maxBitPlane(t\_resolution)+1}$, where maxBitPlane (t_resolution) is not dynamically selected, their bit plane information, which is the most significant, is inserted into the "highest" possible data block (t_x,t_y,t_resolution, maxBitPlane(t_resolution))

In such a case, this most significant data block contains the data of possibly several bit planes.
2. In lossy image coding, it is preferable to threshold (discard) all coefficients whose absolute value is below some given threshold $\epsilon>0$. In such a case each data block having the coordinates identified above at (1.2) is associated with the bit plane $[\epsilon 2^{t\_bitPlane}, \epsilon 2^{t\_bitPlane+1})$. Observe that coefficients whose absolute value is smaller than $\epsilon$ are not reported in any data block and therefore never transmitted.
3. There are cases where different thresholds were chosen for different types of coefficients. This might be done internally by a preprocess stage before the encoding algorithm (see further description later in section 6.1.1), or externally in the case where the original image is a JPEG image already containing encoded quantized subband coefficients. In such a case, $\epsilon$ is chosen as the minimal threshold. Yet all the threshold values are used in the coding algorithm to predetermine the significance of a coefficient at a certain bit plane $[\epsilon 2^{t\_bitPlane}, \epsilon 2^{t\_bitPlane+1})$ and improve the coding efficiency. Furthermore, if a coefficient is known to be quantized, it can be handled more efficiently by the coding algorithm, and transmission of fine precision data can be avoided. This can be achieved by equipping the coding algorithm with the knowledge of the given quantization scheme. These exceptions are explained in further detail later in section 4.1.3.1.
4. A simple generalization of the above for more than one component can be performed by associating the coefficients of all components of a tile in the same absolute value range with the same data block. However, this might not be efficient in the case where one component is visually more significant than others. This is when the original image pixels are converted from their original color space into a coding color space such as $YC_BC_R$, YUV or YIQ (see A. Drukarev, "Compression related properties of color spaces", Proc. SPIE Vol. 3024, 1997; and N. Moroney and M. Fairchild, "Color space selection for JPEG image compression", J. Elec. Imaging, Vol. 4(4), pp. 373–381, 1995). In these color spaces, the Y component represents the luminance of the color image and thus is more visually significant than the other two components which represent the color information. Furthermore, in lossy coding one typically applies smaller threshold to the luminance component. In such a case, assuming the coefficients of each component c are thresholded with $\epsilon_c>0$, we insert to the data block (1.2) with t_bitPlane$\geq$0, for each component c, all of the coefficient data associated with the bit plane interval $[\epsilon_c 2^{t\_bitPlane}, \epsilon_c 2^{t\_bitPlane+1})$. This allows the server 120 to transmit for each ROI more data for visually significant components and less data for other components.

4. The Progressive Subband Coding Algorithm

Before the details of the actual coding algorithm used in the imaging system of the present invention are described, it is important to understand that it is possible to use other variants of the algorithm describe herein, with no modification of the present imaging system architecture. Furthermore, although a "non-Zero Tree type algorithm is described, with some modifications, the imaging system can work with a "Zero Tree" type coder. Zero tree algorithms are described in further detail in publications, such as J. M. Shapiro,"An embedded hierarchical image coder using zero-trees of wavelet coefficients", IEEE Trans. Sig. Proc., Vol. 41, No. 12, pp. 3445–3462, 1993; A. Said and W. Pearlman, "A new, fast and efficient image codec based on set partitioning", IEEE Trans. Circuits and Systems for video Tech., Vol. 6, No. 3, pp. 243–250, 1996; and A. Said and W. Pearlman, "An image multiresolution representation for lossless and lossy compression", IEEE Trans. Image Proc., Vol 5., No. 9, pp. 1303–1310.

The imaging system of the present invention does not, in one embodiment, use a "Zero Tree" method mainly because it is not very well suited for scalability. That is, "Zero Tree" methods are not efficient for low resolution regions of interest. In such cases, "Zero Tree" algorithms actually transmit data associated not only with the ROI, but also with higher resolutions. The overhead is typically 5%–10% more data than the non-"Zero Tree" method described below. Since for large images the user rarely views the highest resolution, this overhead is significant. Furthermore, working in a "Zero Tree" framework requires the computation of relations between coefficients at different resolutions. Although this can be done rather efficiently with some modification of the imaging system, it is still an overhead that should be avoided. Nevertheless, the present invention could be adapted to use the "Zero trees" approach.

A coding algorithm is generally composed of two modules: an encoder and a decoder. The encoder receives as input a group of, possibly thresholded or quantized, coefficients of a subband tile (1.1), encodes the data blocks (1.2) and stores them in a pre-designated location such as a slot in a database. The decoder, upon receiving data blocks, decodes them and reconstructs approximations of the original subband coefficients. The features of the coding algorithm of the present invention, in one embodiment, are:

1. It is relatively simpler and faster than other state of the art methods, such as that described in A. Said and W.

Pearlman, "A new, fast and efficient image codec based on set partitioning", IEEE Trans. Circuits and Systems for video Tech., Vol. 6, No. 3, pp. 243–250, 1996; and D. Taubman, "High performance scalable image compression with EBCOT", preprint, 1999, but with comparable results.

2. The data block ($t\_x, t\_y, t\_resolution, b_0$) can be decoded only if the data blocks ($t\_x, t\_y, t\_resolution, b$) with $b > b_0$ are present at the client side 110. However, this is not a real limitation, since in any rendering mode and for any given ROI, it would be desirable to have the data blocks $b > b_0$ before $b_0$. Other than that, the data block does not depend on any other blocks, which is important for efficient ROI transmission.

3. The coding algorithm can be used for any subband or wavelet transform. In fact, with a few minor additional steps it can be used to efficiently stream regions of interest from JPEG files. Quantized DCT coefficients read from a JPEG file are coded by the algorithm such that once the true quantized value is understood by both encoder and decoder, no more precision bits are required for it. The quantized coefficient is reconstructed exactly as if the original full JPEG image was sent to the client 110.

4. As with most algorithms of this type, the algorithm uses an arithmetic coder. The algorithm can use any reasonable arithmetic coding module, but it is especially designed to work with a binary arithmetic coder. Since a binary coder only codes two symbols, a much faster implementation is possible compared to a general arithmetic coder, such as described in A. Moffat, R. Neal, I Witten, "Arithmetic coding revisited", Proc. DDC (Snowbird, Utah), pp. 202–211, 1995.

4.1. The Encoding Algorithm

The encoding algorithm of the present invention is performed at the server 120. As explained, the present imaging system is unique in that this rather time consuming task is only done locally in near real-time for a ROI, and not the full image. The encoding algorithm is described for images with a single color component, such as grayscale images, but of course may also be applied to images with multiple color components. The straightforward generalization for an arbitrary number of components will be explained later.

The algorithm receives as input the following parameters defined in Table 3:

TABLE 3

| Variable | Meaning |
| --- | --- |
| coef | Matrix of subband coefficients. Typically $3 \times 32^2$ coefficients |
| equalBinSize | True for high bit rate (high quality). False for low bit rate (low quality) |
| $\epsilon_c$ | The minimal threshold for the component |

The coding strategy is similar in some sense to that described in A. Said and W. Pearlman, "A new, fast and efficient image codec based on set partitioning", IEEE Trans. Circuits and Systems for video Tech., Vol. 6, No. 3, pp. 243–250, 1996, but with no "Zero Tree" data. At any given time in the encoding algorithm, a coefficient belongs to one of three groups:

1. Type16: A group of $4 \times 4$ coefficients $\{coef(4i+x, 4j+y)\}_{x,y=0}^{3}$
2. Type4: A Group of $2 \times 2$ coefficients $\{coef(2i+x, 2j+y)\}_{x,y=0}^{1}$
3. Type1: Single coefficient

4.1.1. Encoding Algorithm Initialization

In order to initialize the encoding algorithm, the following procedure is performed:

1. Assign to each coefficient coef(x,y) its bit plane b(x,y) such that:

$$|coef(x,y)| \in [\epsilon_c 2^b, \epsilon_c 2^{b+1})$$

2. Compute the maximum bit plane over all such coefficients:

$$maxBitPlane(tile) = \max_{x,y}(b(x, y))$$

3. Write the value of maxBitPlane(tile) using one byte as the header of the data block:

($t\_x, t\_y, t\_resolution$, maxBitPlane($t\_resolution$))

4. Initialize all the coefficients as members of their corresponding Type16 group.
5. Initialize a list of significant coefficients to be empty.
6. Initialize a coefficient approximation matrix coef as zero.

4.1.2. The Outer Loop

Figure 13:
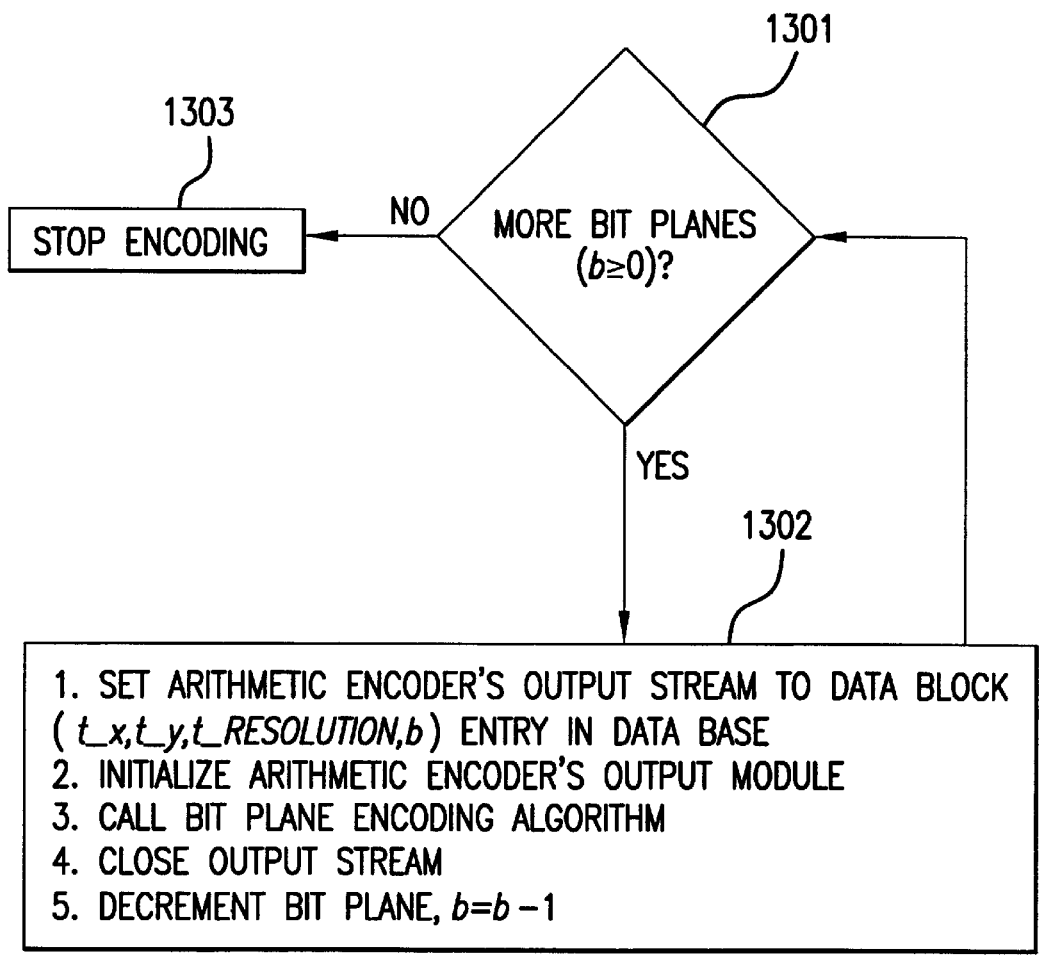
FIG. 13 is a flow diagram describing the outer loop of the server encoding algorithm.

The outer loop of the encoding algorithm is described in FIG. 13. In step 1301 and 1302, the encoding algorithm scans the bit planes from b=maxBitPlane(tile) to b=0. The output of each such bit plane scan is the subband data block (1.2) described previously in section 3. Since the last stage of the encoding algorithm is arithmetic encoding of given symbols, at the beginning of each scan the arithmetic encoding output module is redirected to the storage area allocated for the particular data block. Once the bit plane scan is finished (step 1302) and the data block (1.2) has been encoded, the output stream is closed and the bit plane b is decremented (step 1303).

4.1.3. Bit-plane Scan

Figure 14:
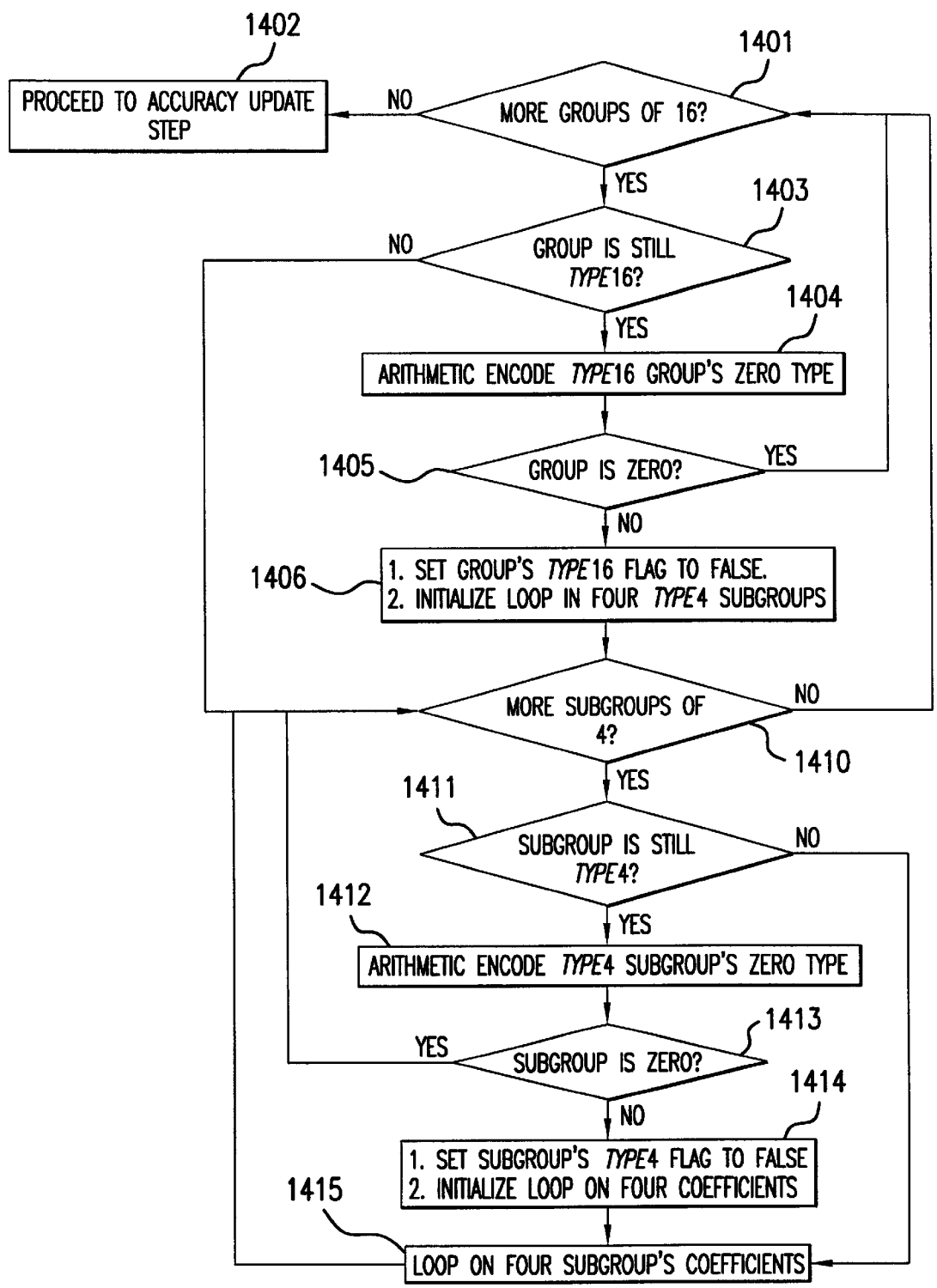
FIG. 14 is a flow diagram describing a bit plane significance scan of the server encoding algorithm.

The framework of the bit plane scan is described in FIG. 14, while the pseudo-code is provided in FIG. 4. The scan, for a given level b, encodes all of the coefficients' data corresponding to the absolute value interval $[\epsilon 2^b, \epsilon 2^{b+1})$ (see section 3, described previously).

4.1.3.1. Significance Scan

As with any progressive subband coding algorithm, the goal is to efficiently encode the locations of the coefficients that are exposed while traversing down to the current bit plane. Naturally, the encoder and decoder have at the time of the scan all the information on what took place at the previous higher bit plane scans. As with most methods, the heuristics of the algorithm is that coefficients which are insignificant at the current bit plane, which are coefficients with absolute value $<\epsilon 2^b$ are spatially correlated. If it is known that a coefficient is insignificant at the bit plane b then with "higher" probability so will his neighbors. This explains why the algorithm groups coefficients into groups of 16 and then 4 and tries to efficiently report (with one symbol) their insignificance. The significance scan uses four binary probability models:

1. Type16 model: used to model significance of the groups of 16.

2. Type4 model: used to model significance of the groups of 4.
3. Type1 model: used to model significance of single coefficients.
4. Sign model: used to model the sign of a significant coefficient.

These models are simply histograms with two levels. They are initialized to equal probabilities at the beginning of each significance scan, and are used by and updated by the arithmetic encoder each time a symbol is encoded. The significance scan is now described in further detail.

Groups of 16. As described in FIG. 14, the first loop is on groups of 4×4 coefficients. In step 1401, if there are no more such groups the significance scan is terminated and we proceed to the accuracy update step 1402 of section 4.1.3.2. In step 1403, if the current group is still labeled Type16, then in step 1404, we compute $$b\_group = \max_{x,y \in group16} b(x, y)$$

and arithmetically encode the boolean value b_group<b. In step 1405, if b_group<b, then the group is currently insignificant and we proceed to the next group (step 1401). Else, in step 1406, we remove the label Type16, split the group to 4 subgroups of 2×2 coefficients and label each of them Type4. If the group of 16 was not labeled Type16 then it must have been split at a higher bit plane. In both cases, we must now continue to handle the four subgroups of four coefficients.

Groups of 4. Beginning in step 1410, we loop over the subgroups of four coefficients. In step 1411, if a subgroup is labeled Type4, $$b\_subgroup = \max_{x,y \in subgroup} b(x, y)$$

is again computed, and the value of the test b_subgroup<b is arithmetically encoded. The arithmetic encoding step 1412 is not performed if the following three conditions hold:

1. We are now at the fourth subgroup.
2. The previous three subgroups are still labeled Type4.
3. The four subgroups were created just now at the current scan by splitting a group of 16.

Under these conditions, it is certain that b_subgroup≧b, else the split would not have taken place. Thus, there is no need to arithmetically encode the significance of the subgroup, since this information will be known also to the decoder at this stage.

In step 1413, if the current subgroup is found to be (still) insignificant, we proceed to the next subgroup (step 1410). Else, in step 1414, the label Type4 is removed, the subgroup is split to the single coefficients and each of them is labeled Type1. If the subgroup was not labeled Type4, then it must have been split at a higher bit plane. In both cases we must now continue to handle each individual coefficient.

Single coefficient. In step 1415, we loop over the four coefficients. If a coefficient coef(x,y) is labeled Type1, the value of the test b(x,y)<b is arithmetically encoded. The arithmetic encoding step is not performed if the following three conditions hold:

1. We are now at the fourth coefficient.
2. The previous three coefficients are still labeled Type1.
3. The subgroup of the four coefficients was split just now at the current scan.

Under these conditions it is certain that b(x,y)≧b, else the split would not have taken place. As in the subgroup case, there is no need to arithmetically encode the significance of the coefficient.

If the current coefficient is found to be (still) insignificant, we proceed to the next coefficient. Else, the sign of the coefficient is arithmetically encoded, the label Type1 removed, and the coefficient is added to the list of significant coefficients. We now set $$coef(x, y) = sign(coef(x, y)) \times \varepsilon_c \times \frac{3 \times 2^b}{2}$$

The value of coef(x,y) simulates the reconstruction of the coefficient by the decoder. At this stage, with no additional information available, this will be the approximated value of the coefficient by the decoder, which corresponds to the middle of the bit plane interval $[\epsilon_c 2^b, \epsilon_c 2^{b+1})$.

4.1.3.2. Accuracy Update

This step is performed if one of the following two conditions hold:

1. equalBinSize=false (see Table 3)
2. b>0

The parameter equalBinSize is set to be true in high quality (high bit rate) lossy coding. In such a case, the value of $\epsilon_c$ will be already relatively small and the step described below at the bit plane b=0 will increase significantly the data transfer for very little visual gain (see S. Mallat and F. Falzon, "Understanding image transform codes", Proc. SPIE Aerospace Conf., 1997).

At the bit plane b, the significant coefficient list contains all the coefficients coef(x,y) for which b(x,y)≧b and their current approximated value coef(x,y). For each coefficient in the list, the value of the test coef(x,y)<coef(x,y) is arithmetically encoded. To that end, a special binary probability model is initialized at the beginning of the step and used by the arithmetic encoder. After the accuracy improvement has been encoded, we then accordingly simulate the reconstruction done by the decoder and update the coefficient's approximated value by adding/subtracting from coef(x,y) the amount $$\varepsilon_c \times \frac{2^b}{4}$$

Note that coefficients which belong to a group of coefficients known to be thresholded with thresh≧$\epsilon_c$ can be more efficiently encoded. For example, assume a coefficient is known (by both encoder and decoder) to be thresholded by thresh≧$2^k \epsilon_c$, k≧1. Also assume that after scanning the bit plane associated with the interval $[\epsilon_c 2^k, \epsilon_c 2^{k+1})$, the coefficient is still insignificant (e.g., has not been reported as significant). In such a case, it is obvious that the coefficient will never become significant in any of the following bit plane scans and can be treated as zero from now on by both encoder and decoder. Furthermore, if a coefficient coef(x,y) is known to have been quantized using a quantization step T, its quantized value can be efficiently reconstructed. As soon as the approximated value coef(x,y) falls in a range of type (T×(n−1),T×(n+1)) for some n∈Z, the approximation takes the value coef(x,y)=T×n and no more accuracy bits are needed to be transmitted.

4.2. The Decoding Algorithm

Obviously, this algorithm is a reversed step of the encoding algorithm of section 4.1 (previously described), performed in the server 120. The decoding algorithm is performed by the client computer 110 during the progressive rendering operation 705 described later in section 5.5. Similar to the encoding algorithm, the decoding algorithm is described for an image with one component (such as a grayscale image), but of course could also be used with an image with more than one component. The input parameters to the decoding algorithm are given below in Table 4:

TABLE 4

| Variable | Meaning |
|---|---|
| coef | Empty matrix of subband coefficients to be filled by the decoding algorithm. |
| EqualBinSize | True for high bit rate/high quality. False for low bit rate/low quality (transmitted from the server). |
| $\epsilon_c$ | The minimal threshold for the component (transmitted from the server). |

4.2.1. Decoding Algorithm Initialization

The initialization steps for the decoding algorithm are described below:

1. Assign to each coefficient Coef(x,y) the value zero.
2. Initialize all the coefficients as members of their corresponding Type16 group.
3. Initialize the list of significant coefficients to be empty.
4. If the "first" data block (t_x,t_y,t_resolution,maxBitPlane(t_resolution))

is available at the client, read the first byte, which is the value of maxBitPlane(tile).

4.2.2. The Outer Loop

Figure 16:
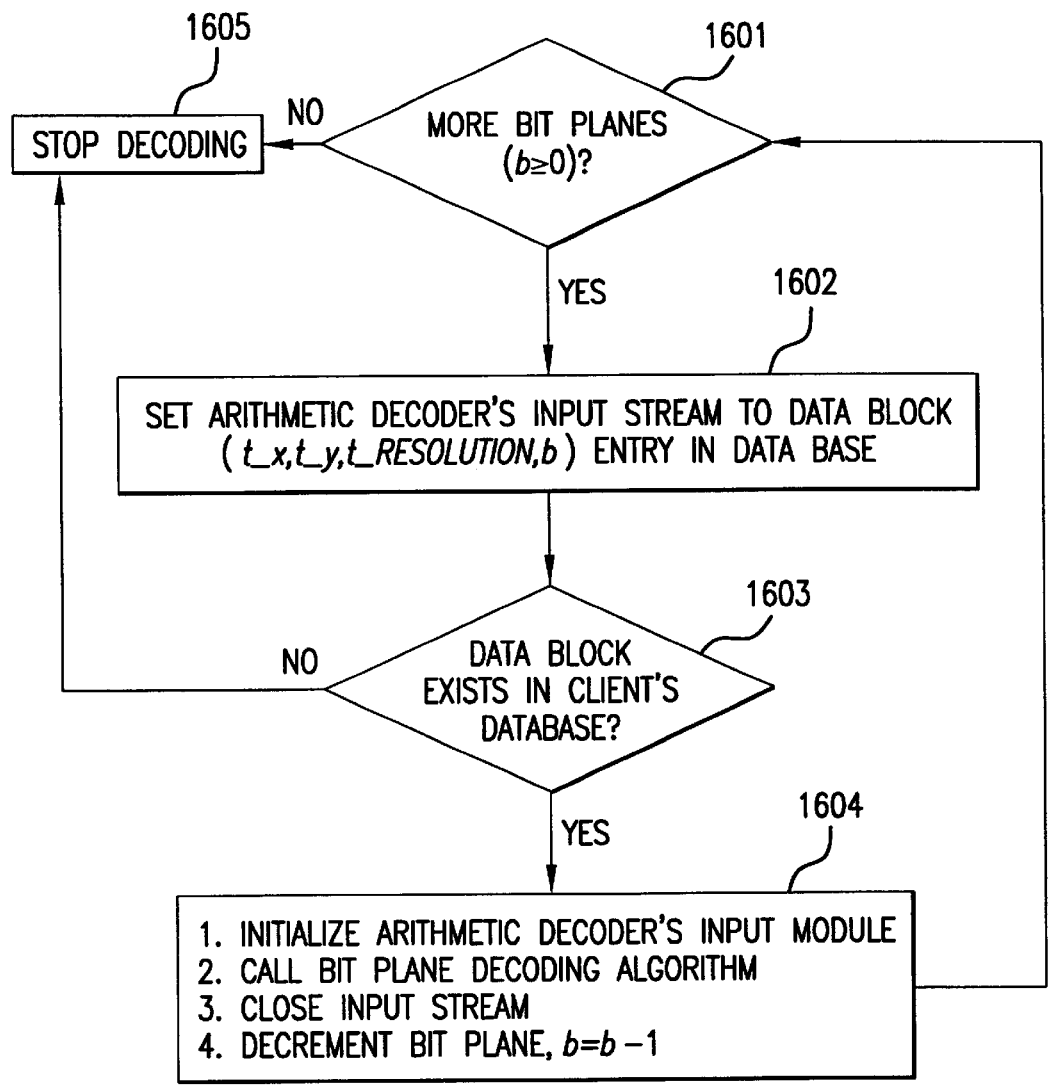
FIG. 16 is a flow diagram describing the outer loop of the client decoding algorithm.

The outer loop of the decoding algorithm is described in FIG. 16. In steps 1601–1604, the decoding algorithm scans the bit planes from the given b=maxBitplane(tile)to b=0. The input to each such bit plane scan is encoded data block (t_x,t_y,t_resolution,b). Since the first stage of the decoding algorithm is arithmetic decoding, at the beginning of each scan the arithmetic decoder's input module is redirected to read from a slot in the database allocated for the particular data block. There are cases where although a subband tile participates in the rendering of the ROI, some of its data blocks will be missing. A data block could be missing due to the following:

1. It was not requested for the current ROI since it is visually insignificant.
2. It was requested from the server, but has not arrived yet.

In any case, the tile's coefficients are required at some accuracy level for the rendering and the rule is obviously to use whatever data is present. At the first missing data block, the outer loop is terminated. For example, if the first data block is missing, all of the coefficients retain their initial value of zero. If only the first few data blocks are present then only coefficients with "large" absolute values will be reconstructed and at a low precision. In step 1604, once the bit plane scan is finished and the data block (t_x,t_y,t_resolution,b) has been decoded, the input stream is closed in step 1605, and the bit plane is decremented.

4.2.3. Bit Plane Scan

A pseudo-code of the bit plane scan is provided in FIG. 15. The scan, for a given level b, decodes all of the coefficients' data corresponding to the absolute value interval $[\epsilon 2^b, \epsilon 2^{b+1})$.

4.2.3.1. Significance Scan

The goal of the significance scan is to decode the locations of the coefficients that are exposed when we traverse down to the current bit plane. Since the scan is a reversed version of the encoding scan described previously in section 4.1.3.1, the description below is brief.

The first loop is on groups of 4×4 coefficients. If there are no more such groups, the significance scan is terminated and we proceed to the accuracy update step described later in section 4.2.3.2. If the current group is still labeled Type16, we decode the boolean value b_Group<b . If b_Group<b, then the group is currently insignificant and we proceed to the next group. Else, the label Type16 is removed and the group is split to 4 subgroups of Type4. If the group of 16 was not labeled Type16, then it must have been split at a higher bit plane. In both cases we must now continue to process the four subgroups of four coefficients. The decoder uses the same probability models as the encoder for the purpose of arithmetic decoding.

Groups of 4. We loop over the subgroups of four coefficients. If a subgroup is labeled Type4, the value of the test b_Subgroup<b is arithmetically decoded. The arithmetic decoding step is not performed if the following three conditions hold:

1. We are now at the fourth subgroup.
2. The previous three subgroups are still labeled Type4.
3. The four subgroups were created just now at the current scan by splitting a group of 16.

Recall that in such a case the group is known to be significant, was not encoded and therefore need not be decoded.

If the current subgroup is (still) insignificant we proceed to the next subgroup. Else, the label Type4 is removed, the subgroup is split to the single coefficients and each of them is labeled Type1. If the subgroup was not labeled Type4, then it must have been split at a higher bit plane. In both cases we must now continue to handle each individual coefficient.

Single coefficient. We loop over the four coefficients. If a coefficient coef(x,y) is still labeled Type1, the value of the test b(x,y)<b is arithmetically decoded. The arithmetic decoding step is not performed if the following three conditions hold:

1. We are now at the fourth coefficient.
2. The previous three coefficients are still labeled Type1.
3. The subgroup of the four coefficients was split just now at the current scan.

Recall that in such a case the coefficient is known to be significant so there is no need to decode the significance of the coefficient.

If the current coefficient is (still) insignificant we proceed to the next coefficient. Else, the sign of the coefficient is arithmetically decoded, the label Type1 is removed and the coefficient is added to the list of significant coefficients. At this stage the current approximated value coef(x,y) at the decoder is $$\text{sign}(\text{coef}(x, y)) \times \varepsilon_c \times \frac{3 \times 2^b}{2}$$

which corresponds to the middle of the bit plane interval $[\epsilon_c 2^b, \epsilon_c 2^{b+1})$.

4.2.3.2. Accuracy Update

At the bit plane b, the significant coefficient list contains all the coefficients coef(x,y) for which $b(x,y) \geq b$ at an approximated value. If this step is performed (see section 4.1.3.2), then for each coefficient in the list, the value of test coef(x,y)<coef(x,y) is arithmetically decoded, where coef (x,y) is the actual value of the coefficient (not known to the decoder). We then accordingly update the approximated value by adding/subtracting from coef(x,y) the amount $$\varepsilon_c \times \frac{2^b}{4}$$

5. Client Workflow

Figure 7:
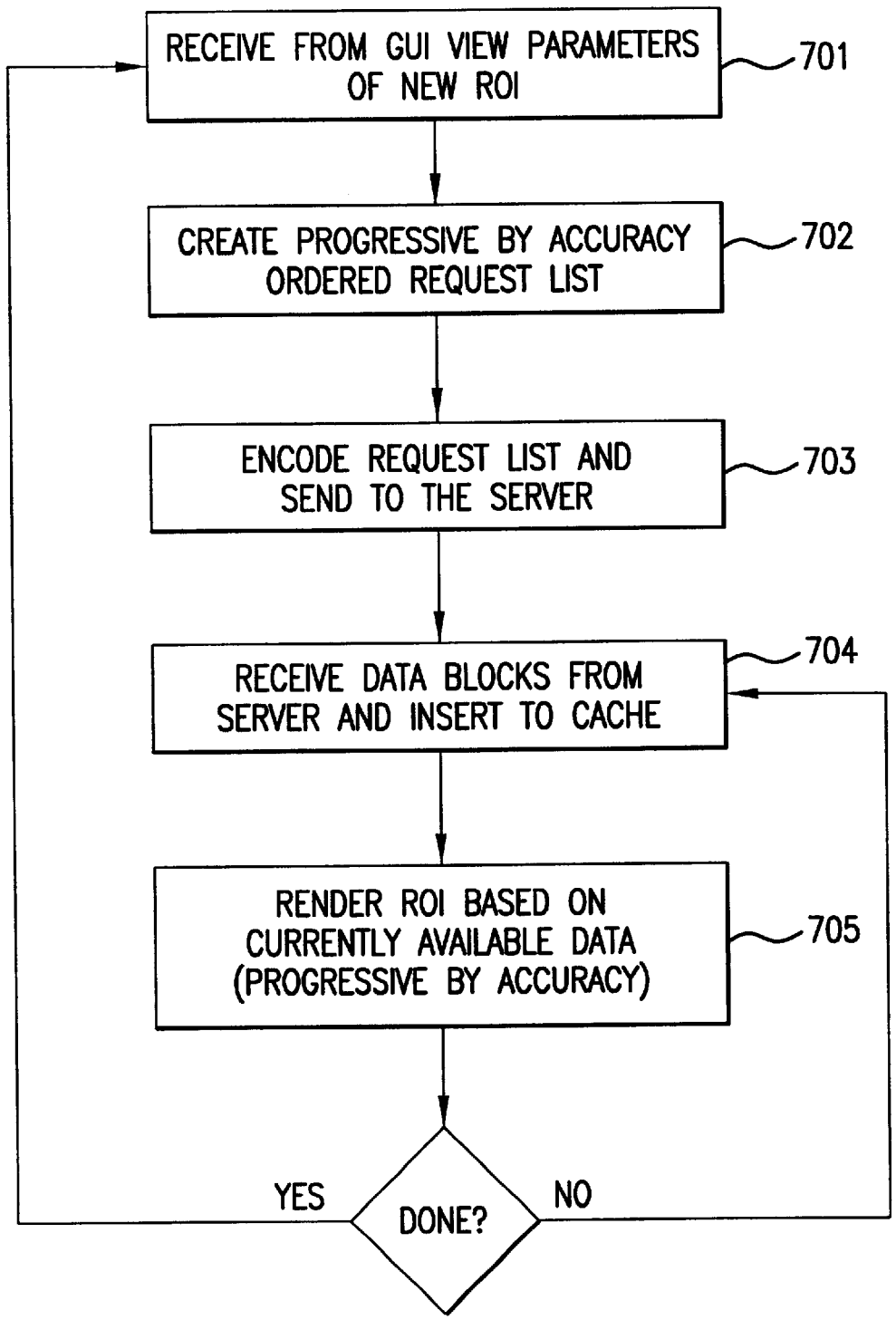
FIG. 7 is a workflow diagram describing the "progressive by accuracy" process for a client.

With reference to FIG. 7, the workflow at the client computer 10 is now described. Any new ROI generated by the user's action, such as a zoom-in or a scroll, invokes in step 701 a call from the GUI interface to the client imaging module with the new ROI view parameters. The client imaging module then computes in step 702 which data blocks (see section 3) are required for the rendering of the ROI, and checks if these data blocks are available in the client cache 111. If not, their coordinate (1.2) is added to a request list ordered according to some progressive mode. The request list is then encoded in step 703 and sent to the server computer 120.

The server computer 120 responds to the request by sending back to the client computer 110 a stream of data blocks, in the order in which they were requested. In step 704, the client computer 110 inserts them to their appropriate location in the distributed database. At various points in time step 705, a rendering of the ROI is invoked. Naturally, the rendering operation is progressive and is able to use only the currently available data in the client's database.

5.1. Step 701: Receiving the ROI Parameters

The imaging module on the client computer 120 receives from the GUI interface module view parameters detailed in Table 5. These parameters are used in step 702 to generate a request list for the ROI. The same parameters are used to render the ROI in step 705.

TABLE 5

| Variable | Meaning |
| --- | --- |
| worldPolygon | A 2D polygon in the original image coordinate system |
| scale | The view resolution. 0 < scale < 1 implies a low view resolution, scale = 1 original resolution and scale > 1 a higher than original view resolution |
| deviceDepth | A number in the set {8,16,24} representing the depth of the output device (screen, printer) |
| viewQuality | A quality factor in the range [1, 7] where 1 implies very low quality and 7 implies lossless quality |
| luminanceMap | If active: a curve defining a mapping of medical images with more than 8 bits (typically 10, 12, 16 bits) per grayscale values to an 8 bit screen |
| progressiveMo | One of: Progressive By Accuracy, Progressive By Resolution, Progressive by Spatial Order |

The basic parameters of a ROI are worldPolygon and scale which determine uniquely the ROI view. If the ROI is to be rendered onto a viewing device with limited resolution, then a worldPolygon containing a large portion of the image will be coupled by a small scale. In the case where the rendering is done by a printer, the ROI could be a strip of a proof resolution of the original image that has arrived from the server computer 120. This strip is rendered in parallel to the transmission, such that the printing process will terminate with the end of transmission. The other view parameters determine the way in which the view will be rendered. The parameters deviceDepth and viewQuality determine the quality of the rendering operation. In cases the viewing device is of low resolution or the user sets the quality parameter to a lower quality, the transfer size can be reduced significantly (see section 5.2).

The parameter luminanceMap is typically used in medical imaging for grayscale images that are of higher resolution than the viewing device. Typically, screens display grayscale images using 8 bits, while medical images sometimes represent each pixel using 16 bits. Thus, it is necessary to map the bigger pixel range to the smaller range of [0,255].

Lastly, the parameter progressiveMode determines the order in which data blocks should be transmitted from the server 120. The "Progressive By Accuracy" mode is the best mode for viewing in low bandwidth environments. "Progressive By Resolution" mode is easier to implement since it does not require the more sophisticated accuracy (bit plane) management and therefore is commonly found in other systems. The superiority of the "progressive by accuracy" mode can be mathematically proven by showing the superiority of "non-linear approximation" over "linear approximation" for the class of real-life images. See, e.g., R. A. DeVore, "Nonlinear approximation", Acta Numerica, pp. 51–150, 1998.

The "Progressive by Spatial Order" mode is designed, for example, for a "print on demand" feature where the ROI is actually a low resolution "proof print" of a high resolution graphic art work. In this mode the image data is ordered and received in a top to bottom order, such that printing can be done in parallel to the transmission.

5.2. Step 702: Creating the Request List

In step 702, using the ROI view parameters, the client imaging module at the client computer 110 calculates data blocks request list ordered according to the progressiveMode. Given the parameters worldPolygon and Scale, it may be determined which subband tiles (1.1) in the "frequency domain" participate in the reconstruction of the ROI in the "time domain". These tiles contain all the coefficients that are required for an "Inverse Subband/Wavelet Transform" (IWT) step that produces the ROI. First, the parameter dyadicResolution (ROI) is computed, which is the lowest possible dyadic resolution higher than the resolution of the ROI. Any subband tiles of a higher resolution than dyadicResolution (ROI) do not participate in the rendering operation. Their associated data blocks are therefore not requested, since they are visually insignificant for the rendering of the ROI. If scale$\geq 1$, then the highest resolution subband tiles are required. If scale$\leq 2^{1-numberOfResolutions}$ then only the lowest resolution tile is required. For any other value of scale we perform the mapping described below in Table 6.

TABLE 6

| scale | highestSubbandResolution |
| --- | --- |
| scale $\leq 2^{1-numberOfResolutions}$ | 1 |
| $2^{1-numberOfResolutions} <$ scale $\leq 1$ | numberOfResolutions$-\lfloor -\log_2 (scale) \rfloor$ |
| scale $> 1$ | numberOfResolutions |

Figure 6:
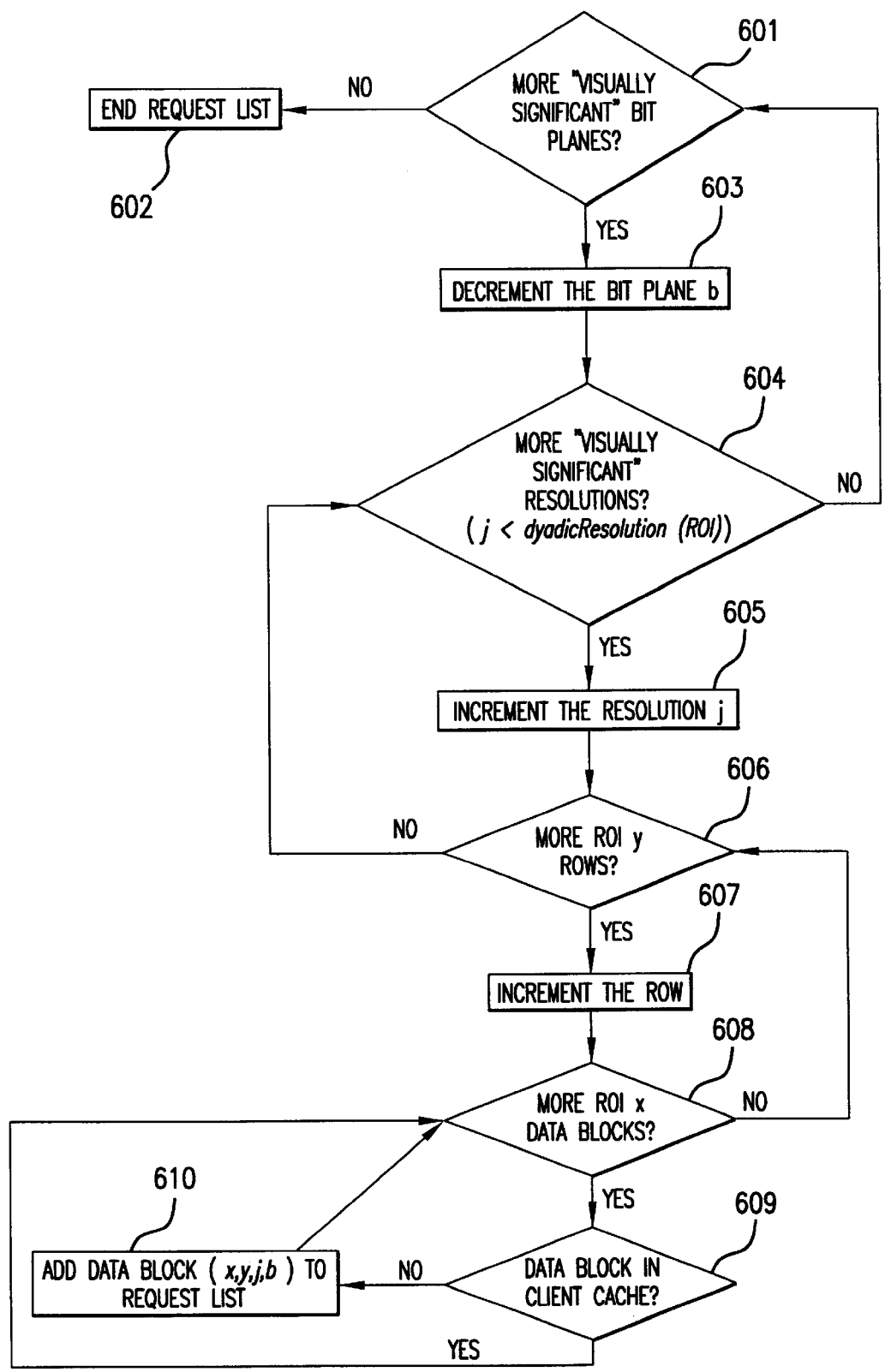
FIG. 6 is a workflow diagram describing how a "progressive by accuracy" request list for a region of interest may be composed.

Once it has been determined which subband tiles participate in the rendering of the ROI, it is necessary to find which of their data blocks are visually significant and in what order they should be requested. Using well known rate/distortion rules from the field of image coding (such as is described in S. Mallat and F. Falzon, "Understanding image transform codes", Proc. SPIE Aerospace Conf., 1997), it is not too difficult to determine an optimal order in which the data blocks should be ordered by the client imaging module (and thus delivered by the server 120). This optimal order is described in steps 601–610 of FIG. 6 for the "Progressive By Accuracy" mode. The underlying mathematical principal behind this approach is "Non-Linear Approximation".

First, the subband coefficients with largest absolute values are requested since they represent the most visually significant data such as strong edges in the image. Notice that high resolution coefficients with large absolute value are requested before low resolution coefficients with smaller absolute value. Within each given layer of precision (bit plane) the order of request is according to resolution; low resolution coefficients are requested first and the coefficients of highestSubbandResolution are requested last.

The main difficulty of this step is this: Assume a subband tile (1.1) is required for the rendering of the ROI. This means that t_resolution≦dyadicResolution (ROI) and the tile is required in the IWT procedure that reconstructs the ROI. It must be understood which of the data blocks (1.2) associated with the subband tile represent visually insignificant data and thus should not be requested. Sending all of the associated data blocks will not affect the quality of the progressive rendering. However, in many cases transmitting the "tail" of data blocks associated with high precision is unnecessary since it will be visually insignificant. In such a case, the user will see that the transmission of the ROI from the server 120 is still in progress, yet the progressive rendering of the ROI seems to no longer to change the displayed image.

Some examples and notes follow:

1. Assume the ROI is a low resolution rendering of the full image at the resolution n. Thus, all the subband coefficients at the subband resolutions $1 \leq j \leq n$ participate in the IWT of the ROI. But only the very large coefficients of these subbands are visually significant for a rendering of this ROI, even at very high qualities. Also these large coefficients are only required at a very low precision. Thus, we can request from the server 120 only the first few data blocks associated with each subband tile at resolutions $\leq n$, since they correspond to the highest bit planes.
2. Assume the ROI is at the highest resolution of the image. In a normal setting this would mean that for any subband tile participating in the reconstruction of the ROI, all of the associated data blocks should be requested, such that the rendering will be of a very high (or even lossless) quality. But if the parameter deviceDepth (see Table 5) is set at low resolution (e.g., the viewing device is of low resolution) or the parameter viewQuality is set at low quality (e.g., the user is currently not interested in high quality rendering), the last data blocks of each subband tile corresponding to high precision need not be ordered.

The method to determine which of the first data blocks are required is as follows. For each subband tile (t_x, t_y,t_resolution) participating in the reconstruction of the ROI, we initialize the set of requested data blocks to the "maximal" set:

(t_x,t_y,t_resolution,t_bitPlane)

minRequestPlane≦t_bitPlane≦maxBitPlane(t_resolution)

with minRequestPlane=0. Recall that at this point the client 120 does not know the amount of data each absent data block contains. In many cases requested data blocks will turn out to be empty.

1. We remove from the data set all the data blocks (t_x,t_y,t_resolution,t_bitPlane)

such that t_bitPlane<numberOfResolutions−dyadicResolution(ROI)

That is, one data block/bit plane, for each lower resolution. We update minRequestPlane accordingly. This simple rule of thumb that the lower the resolution the less precision required originates from the way subband coefficients are scaled according to their resolution.
2. Whenever deviceDepth=8, the output device is of low resolution. In such a case the client can request less precision. We decrement one bit plane and set minRequestPlane=min(maxBitPlane(t_resolution),minRequestPlane+1)

3. If viewQuality is set at a lower viewing quality, we further remove high precision data blocks from the set. Again, the rule is a removal of one bit plane per lower quality.
4. For subband tiles at dyadicResolution (ROI), we perform an extra data reduction step, an interpolation between the precision layers: minRequestPlane and maxBitPlane(t_resolution). The underlying idea of the interpolation is this: if $-\log_2(\text{scale})=$dyadicResolution (ROI) then the ROI is exactly at the dyadic resolution dyadicResolution (ROI) and the parameter minRequestPlane should not be updated. On the other hand, if $-\log_2(\text{scale})=$dyadicResolution(ROI)−1 then the ROI is at a lower dyadic resolution than the subband tile and non of the data blocks should be ordered. Thus, for any scale between these two values, we take a linear interpolation between these two extremes. This technique leads to a unique feature of continuous data streaming control. In cases where the user performs a sequence of zooms with small increments, a little additional data is ordered and rendered each time. Thus, although the system is using a multiresolution representation of the image discretized to dyadic resolutions, the fourth accuracy coordinate makes the representation more "continuous".

5.3. Step 703: Encoding the Request List

In step 703, the client imaging module in the client computer 110 encodes the request list into a request stream which is sent to the server computer 120 via the communication network 130 (see FIG. 1). The request list encoding algorithm is a simple rectangle-based procedure. The heuristics of the algorithm is that the requested data block usually can be grouped into data block rectangles. From the request list of data blocks indexed by (1.2) the encoding algorithm computes structures of the type $$\{(t\_x,t\_y,t\_resolution,t\_bitplane),n_x,n_y\}, n_x,n_y \geq 1 \quad (1.3)$$

Each such structure represents the $n_x \times n_y$ data blocks $\{(t\_x+i, t\_y+j, t\_resolution, t\_bitPlane)\}$, $0 \leq i < n_x, 0 \leq j < n_y$ The encoding algorithm attempts to create the shortest possible list of structures of type (1.3) which can be done by collecting the data blocks to the largest possible rectangles. It is important to note that the algorithm ensures the order of data blocks in the request list is not changed, since the server 120 will respond to the request stream by transmitting data blocks in the order in which they were requested. A good example of when this works well is when a user zooms in into a ROI at a high resolution that was never viewed before. In such a case the request list might be composed of hundreds of requested data blocks, but they will be collected to one (x,y) rectangle (1.3) for each pair (t_resolution,t_bitPlane).

5.4. Step 704: Receiving Data Blocks

In step 704, the client computer 110 upon receiving from the server computer 120 an encoded stream containing data blocks, decodes the stream and inserts the data blocks into their appropriate location in the distributed database using their ID as a key. The simple decoding algorithm performed here is a reversed step of the encoding described later in section 6.5. Since the client 110 is aware of the order of the data blocks in the encoded stream, only the size of each data block need be reported along with the actual data. In case the server 120 informs of an empty data block, the receiving module marks the appropriate slot in the database as existing but empty.

Recall that the subband tile associated with each data block is denoted by the first three coordinates of the four coordinates of a data block (t_x,t_y,t_resolution). From the subband tile's coordinates the dimensions are calculated of the area of visual significance; that is, the portion of the ROI that is affected by the subband tile. Assume that each subband tile is of length tileLength and that the wavelet basis used has a maximal filter size maxFilterSize, then defining $hFilterSize := \lceil maxFilterSize/2 \rceil$ and $factor := numberOfResolutions - t\_resolution + 1$, we have that the dimensions of the affected region of the ROI (in the original image's coordinate system) are $$[t\_x \times tileLength^{factor} - hFilterSize^{factor}, (t\_x+1) \times tileLength^{factor} + hFilterSize^{factor}] \times [t\_y \times tileLength^{factor} - hFilterSize^{factor}, (t\_y+1) \times tileLength^{factor} + hFilterSize^{factor}]$$

These dimensions are merged into the next rendering operation's region. The rendering region is used to efficiently render only the updated portion of the ROI.

5.5. Step 705: Progressive Rendering

During the transmission of ROI data from the server 120 to the client 110, the client 110 performs rendering operations of the ROI. To ensure that these rendering tasks do not interrupt the transfer, the client may run two program threads: communications and rendering. The rendering thread runs in the background and draws into a pre-allocated "off-screen" buffer. Only then does the client 110 use device and system dependent tools to output the visual information from the off-screen to the rendering device such as the screen or printer.

The rendering algorithm performs reconstruction of the ROI at the highest possible quality based on the available data at the client 110. That is, data that was previously cached or data that just arrived from the server 120. For efficiency, the progressive rendering is performed only for the portion of the ROI that is affected by newly arrived data; specifically, data that arrived after the previous rendering task began. This updated region is obtained using the method of step 704, described previously in section 5.4.

The parameters of the rendering algorithm are composed of two sets:

1. The ROI parameters described in Table 5.
2. The parameters transmitted from the server 120 explained in Table 3, with the exception of the jumpSizeparameter, which is a server-only parameter.

The rendering algorithm computes pixels at the dyadic resolution dyadicResolution (ROI). Recall that this is the lowest possible dyadic resolution which is higher than the resolution of the ROI. The obtained image is then resized to the correct resolution.

Figure 22:
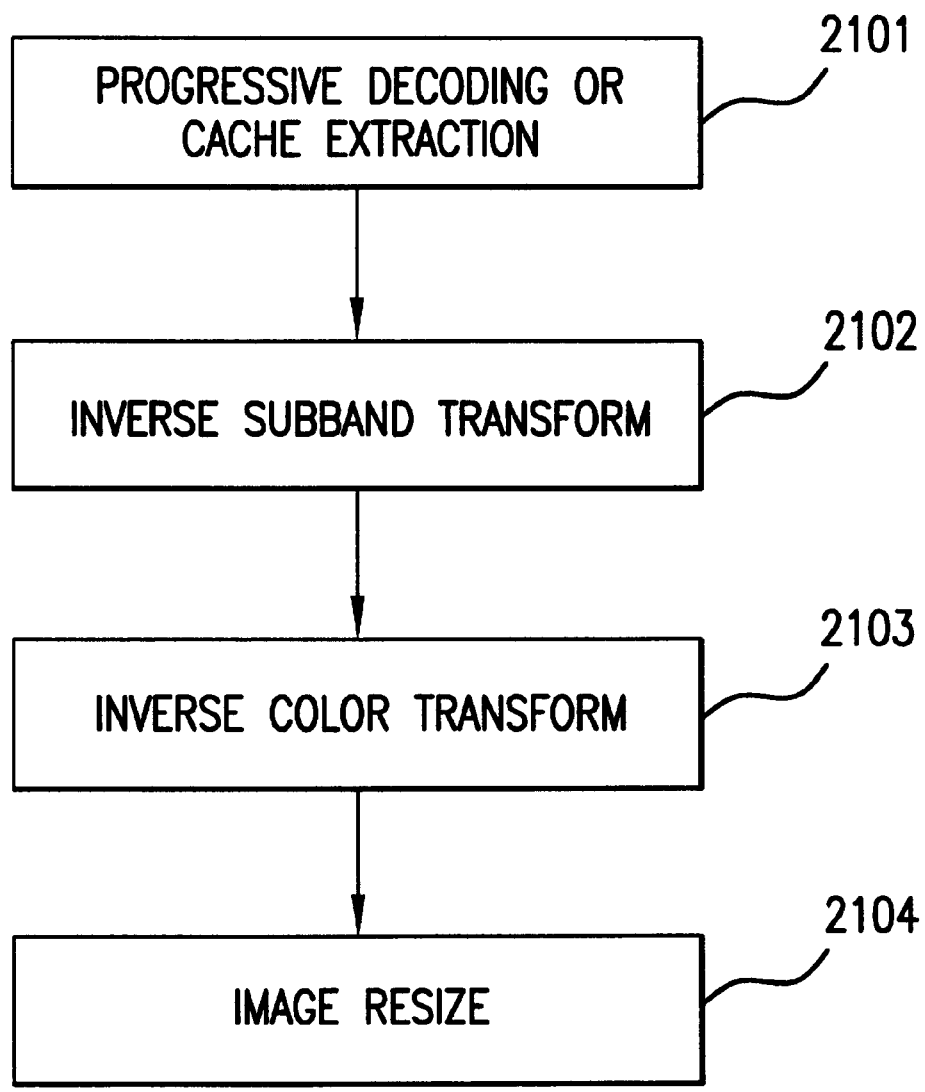
FIG. 22 is a flow diagram describing the progressive rendering steps.

Using a tiling of the multiresolution representation of the ROI, the steps of the algorithm are performed on a tile by tile basis as described in FIG. 22. Since the tiles' length are tileLength, which is typically chosen as 64, the rendering algorithm is memory efficient. This is especially important in printing mode, when the rendered ROI may actually be a proof print (low) resolution of the full image.

5.5.1. The Rendering Rate

As ROI data is transmitted to the client 110, the rendering algorithm is performed at certain time intervals of a few seconds. At each point in time, only one rendering task is performed for any given displayed image. To ensure that progressive rendering does not become a bottleneck, two rates are measured: the data block transfer rate and the ROI rendering speed. If it predicted that the transfer will be finished before a rendering task, a small delay is inserted, such that rendering will be performed after all the data arrives. Therefore, in a slow network scenario (as the Internet often is), for almost all of the progressive rendering tasks, no delay is inserted. With the arrival of every few kilobytes of data, containing the information of a few data blocks, a rendering task visualizes the ROI at the best possible quality. In such a case the user is aware that the bottleneck of the ROI rendering is the slow network and has the option to accept the current rendering as a good enough approximation of the image and not wait for all the data to arrive.

5.5.2. Memory Constraint Subband Data Structure

This data-structure is required to efficiently store subband coefficients, in memory, during the rendering algorithm. This is required since the coefficients are represented in long integer (lossless coding mode) or floating-point (lossy coding mode) precision which typically require more memory than pixel representation (1 byte). In lossy mode, the coefficients at the client side 110 are represented using floating-point representation, even if they were computed at the server side 120 using an integer implementation. This will minimize round-off errors.

At the beginning of the rendering algorithm, coefficient and pixel memory strips are initialized. dyadicWidth (ROI) may be denoted as the width of the projection of the ROI onto the resolution dyadicResolution (ROI). For each component and resolution $1 < j \leq dyadicResolution$ (ROI), three subband coefficient strips are allocated for the three types of subband coefficients: hl, hl, hh. The coefficient strips are allocated with dimensions $$\left[ 2^{j-dyadicResolution(ROI)-1} \times dyadicWidth(ROI), \right.$$

$$\left. \frac{3}{2} \times tileLength + \frac{maxFilterSize}{2} \right]$$

For each component and resolution 1≦j<dyadicResolution a pixel strip is allocated with dimensions $$\left[ 2^{j-dyadicResolution(ROI)} \times dyadicWidth(ROI), \times tileLength + \frac{maxFilterSize}{2} \right]$$

Figure 21:
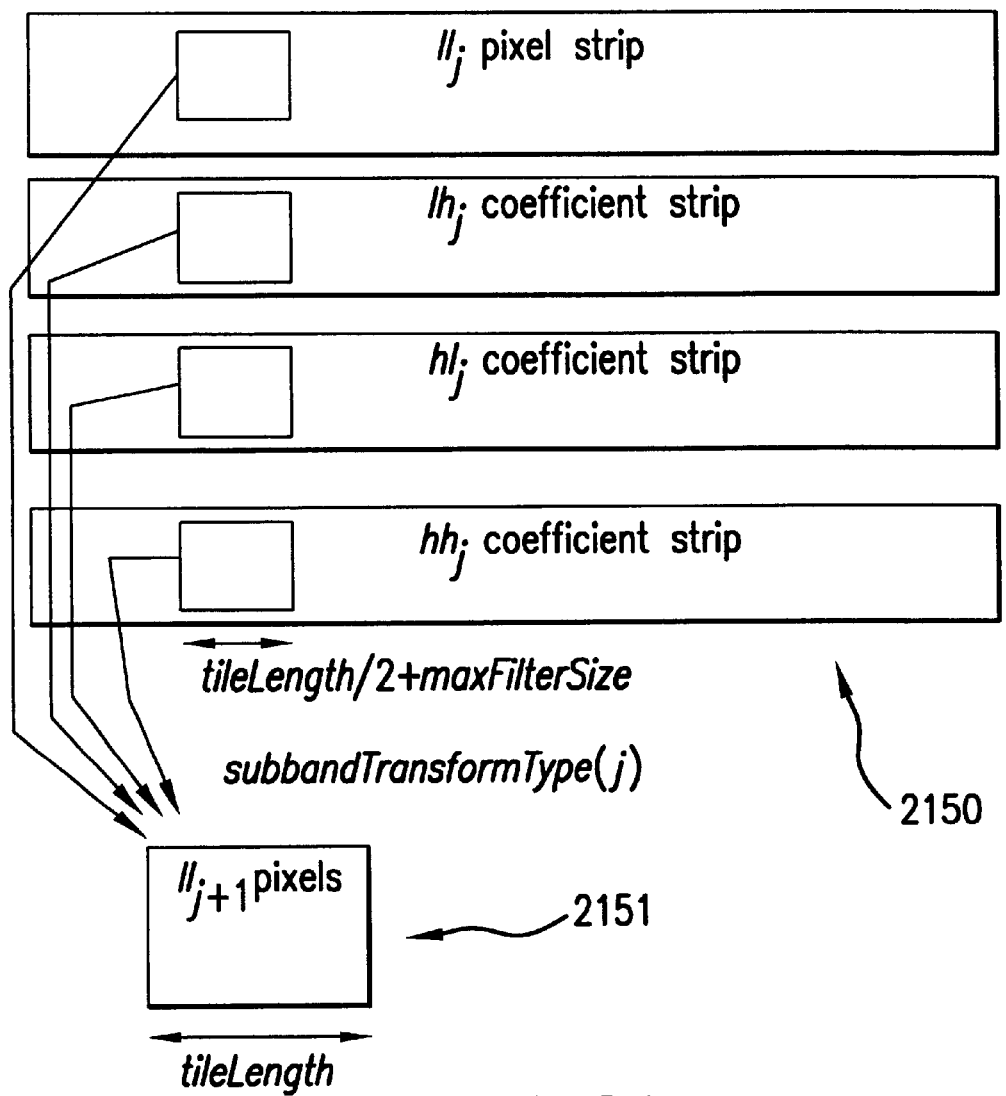
FIG. 21 is a diagram depicting the local inverse subband transform.

Beginning with the lowest resolution 1, the algorithm proceeds with a recursive multiresolution march from the top of the ROI to bottom (y direction). The pseudo-code for this recursive march is provided in FIG. 23. Referring to FIGS. 21 and 22, in step 2101, the multiresolution strips are filled with sub-tiles of coefficients 2150 decoded from the database or read from the memory cache. From the coefficients we obtain multiresolution pixels 2151 using an inverse subband transform step 2102 (shown in further detail in FIG. 21). Each time a tile of pixels at resolutions j<dyadicResolution(ROI) is reconstructed, it is written into the pixel strip at the resolution j. Each time a tile of pixels at the highest resolution dyadicResolution (ROI) is reconstructed, it is fed into the inverse color transform and resizing steps 2103, 2104.

5.5.3. Step 2101: Decoding and Memory Caching

Figure 17:
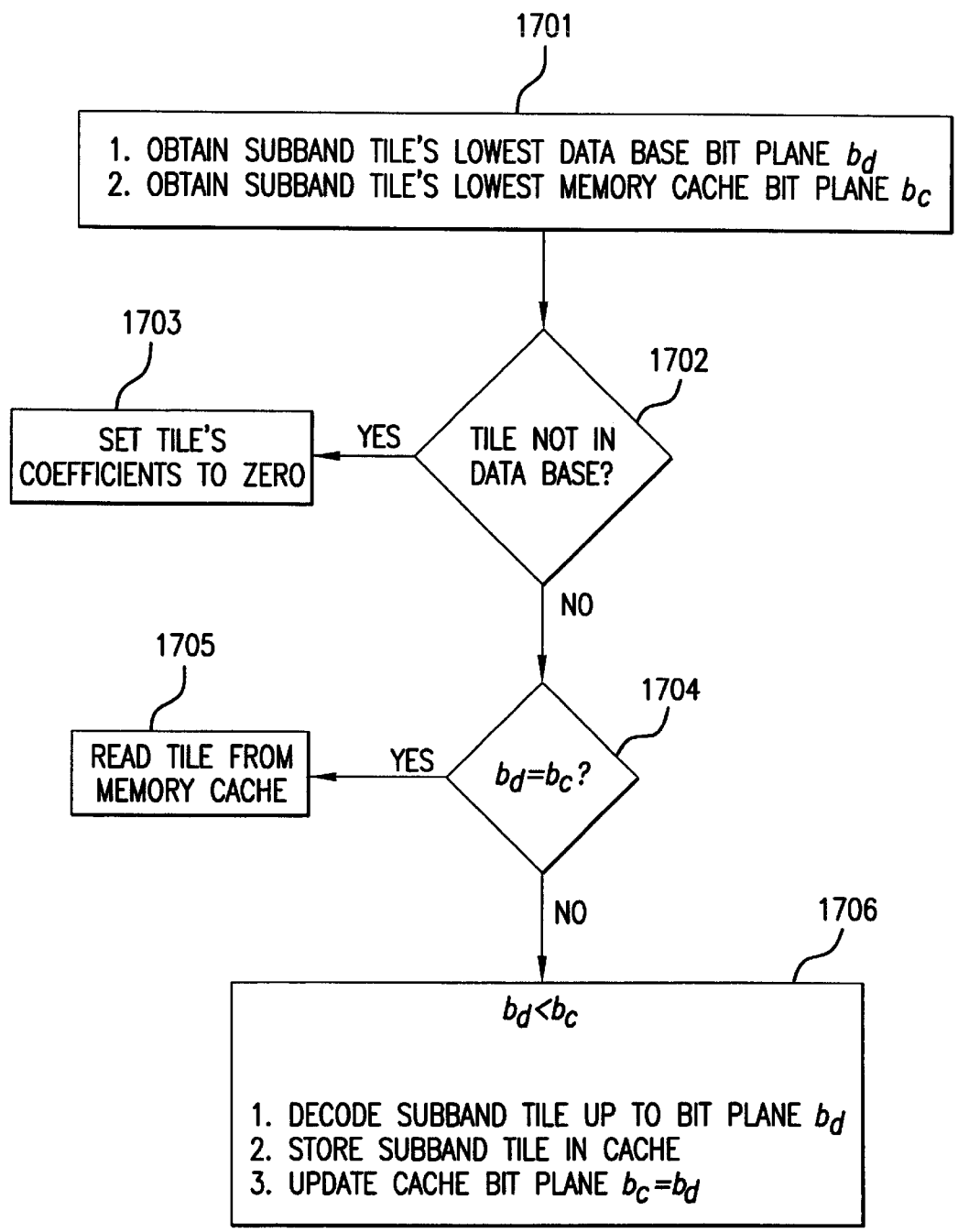
FIG. 17 is a flow diagram describing the subband tile extraction of the client progressive rendering process.

The subband coefficients data structure described previously in section 5.5.2 is filled on a tile basis. Each such subband tile is obtained by decoding the corresponding data blocks stored in the database or reading from the memory cache. The memory cache is used to store coefficients in a simple encoded format. The motivation is this: the decoding algorithm described previously in section 4.2 is computationally intensive and thus should be avoided whenever possible. To this end the rendering module uses a memory cache 111 where subband coefficient are stored in very simple encoded format which decodes very fast. For each required subband tile, the following extraction procedure is performed, described in FIG. 17, beginning at step 1701. In step 1702, if no data blocks are available in the database for the subband tile, its coefficients are set to zero (step 1703). In step 1704, if the tile's memory cache storage is updated, namely it stores coefficients in the same precision as in the database, then the coefficients can be efficiently read from there (step 1705). In step 1706, the last possibility is that the database holds the subband tile in higher precision. Then, the tile is decoded down to the lowest available bit plane using the algorithm previously described in section 4.2 and the cached representation is replaced with a representation of this higher precision information.

5.5.4. Step 2102: Inverse Subband Transform

Figure 20:
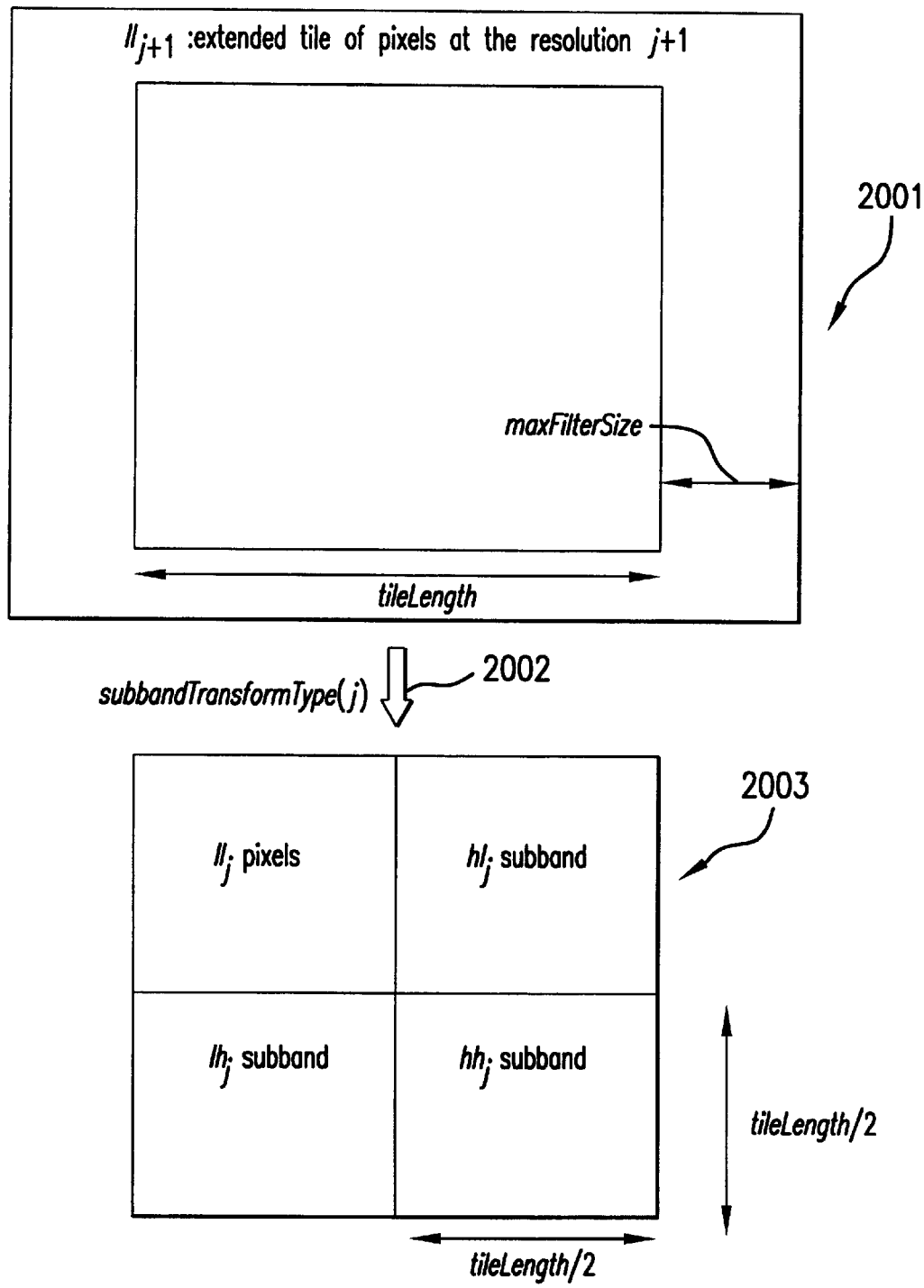
FIG. 20 is a diagram describing the tiles at the local separable forward subband transform.

This is an inverse step to step 904 performed in the server 120 (see section 6.1.6, described later). As shown in FIG. 20, four extended subband coefficient sub-tiles of length tileLength/2+maxFilterSize at the resolution j (shown as reference numeral 2001) are read from the coefficient strips data structure and transformed to a tile of pixels (reference numeral 2003) at the next higher resolution using subbandTransformType(j) (reference numeral 2002). If j+1<dyadicResolution(ROI), the tile of pixels obtained by this step is inserted into the pixel memory strip at the resolution j+1. If j+1=dyadicResolution (ROI) the tile of pixels is processed by the next step of color transform.

5.5.5. Step 2103: Inverse Color Transform

This is an inverse step to step 903 performed at the server 120 (see §6.1.5, described later). It is performed only for tiles of pixels at the resolution highestSubbandResolution. At this stage, all of the pixels of each such tile are in the outputColorSpace and so need to be transformed into a displaying or printing color space. For example, if the original image at the server 120 is a color image in the color space RGB, the pixels obtained by the previous step of inverse subband transform are in the compression color space YIQ. For viewing they must be transformed back to RGB representation. If the ROI is at an exact dyadic resolution, then the tile of pixels in the rendering color space is written into the off-screen buffer. Else it is resized in the next step.

5.5.6. Step 2104: Image Resize

In case the resolution of the ROI is not an exact dyadic resolution, the image obtained by the previous step must be re-sized to this resolution. This can be accomplished using operating system imaging functionality. In most cases the operating system's implementation is sub-sampling which produces in many cases an aliasing effect which is visually not pleasing. To provide higher visual quality, the imaging system of the present invention may use the method of linear interpolation, for example described in J. Proakis and D. Manolakis, "digital signal processing", Prentice Hall, 1996. The output of the interpolation is written to the off-screen buffer. From there it is displayed on the screen using system device dependant methods.

6. Server Workflow

Figure 8:
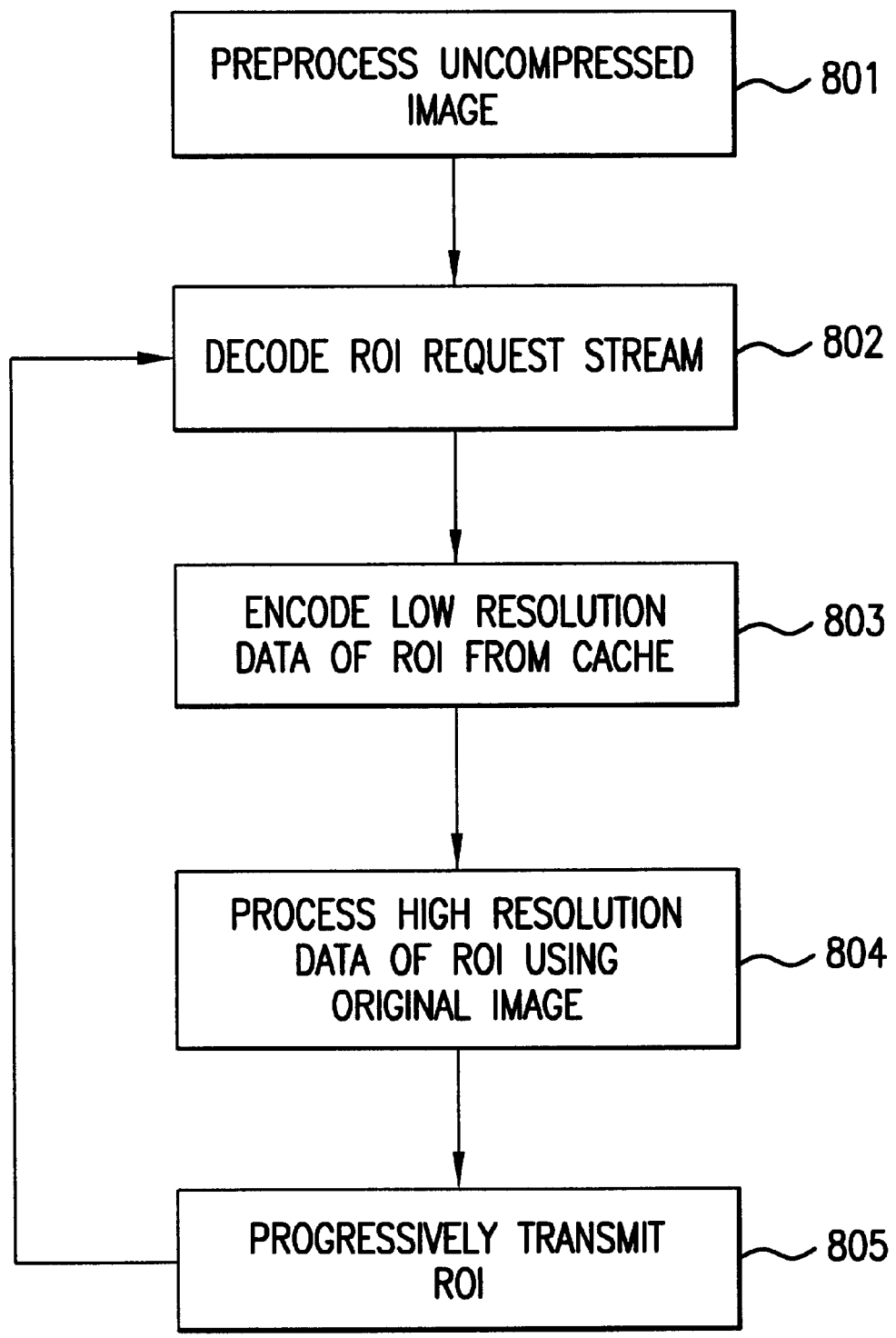
FIG. 8 is a diagram describing the server workflow.

With reference to FIG. 8, the operation of the server computer 120 (FIG. 1) will now be described. Initially, an uncompressed digital image is stored in, for example, storage 122 of the server computer 120. This uncompressed digital image may be a two-dimensional image, stored with a selected resolution and depth. For example, in the medical field, the uncompressed digital image may be contained in a DICOM file. In the graphic arts field, the uncompressed image may be, for example, in the Tiff standard format or a result of a RIP (Raster Image Processing) algorithm converting a postscript file to a raster image.

Once the client computer 110 requests to view or print a certain image, the server 120 performs the preprocessing step 801. This step is a computation performed on data read from the original digital image. The results of the computation are stored in the server cache device 121. After this fast computation, a ready to serve message is sent from the server 120 to the client 110 containing basic information on the image.

In step 802, the server 120 receives an encoded stream of requests for data blocks associated with a ROI that needs to be rendered at the client 110. The server 120 then decodes the request stream and extracts the request list.

In step 803, the server 120 reads from cache 121 or encodes data block associated with low resolution portions of the ROI, using the cached result of the preprocessing stage 801.

If the ROI is a high resolution portion of the image, the server 120, in step 804, reads from cache 121 or performs a "local" and efficient version of the preprocessing step 801. Specifically, a local portion of the uncompressed image, associated with the ROI, is read from the storage 122, processed and encoded. Data encoded in steps 803–804 is progressively sent to the client 110 in the order it was requested.

6.1. Step 801: Preprocessing

Figure 9:
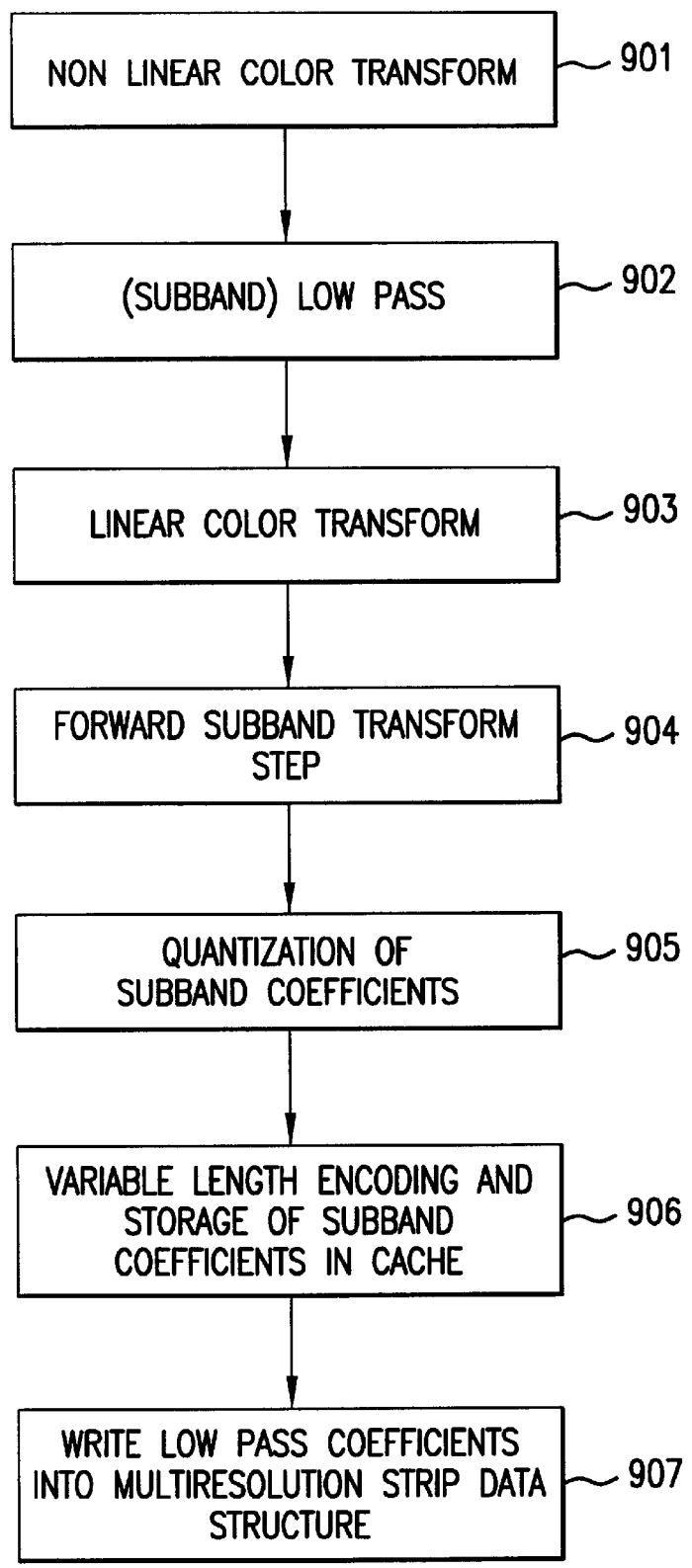
FIG. 9 depicts preprocessing steps that may be performed by the server.

The preprocessing step is now described with respect to FIG. 9. The preprocessing algorithm's goal is to provide the fastest response to the user's request to interact with the image. Once this fast computational step is performed, the server 120 is able to provide efficient Pixel-On-Demand™ transmission of any client ROI requests that will follow. In most cases the first ROI is a view of the full image at the highest resolution that fits the viewing device. The preprocessing algorithm begins with a request for an uncompressed image that has not been processed before or has been processed but the result of this previous computation has been deleted from the cache 121. As explained, this unique algorithm replaces the possibly simpler, yet less effective, procedure of encoding the full image into some progressive format. This latter technique will provide a much slower response to the user's initial request then the present technique described below.

At the end of the algorithm a ready to serve ROI of the image message is sent to the client 110 containing basic information on the image. While some of this information, image dimensions, original color space, resolution etc., is available to the user of the client computer 110, most of this information is internal and required by the client 110 to formulate ROI request lists (see section 5.2, described previously) and progressively render (see section 5.5).

Next the preprocessing algorithm is described in detail.

6.1.1. Preprocessing Parameters

TABLE 7

| Variable | Meaning |
|---|---|
| losslessMode | If true, preprocessing will prepare data that can be used for lossless transmission. |
| subbandTransformType | The framework allows the ability to select a different subband transform for each resolution of each image. The technical term is: non-stationary transforms. |
| numberOfResolutions | The number of resolutions in the Multi-resolution structure calculated for the image.<br>numberOfResolutions = $\log_2(\sqrt{\text{ImageSize}})$. |
| jumpSize | A number in the range [0,numberOfResolutions − 1]. The preprocessing stage computes only the top lower part of the image's multiresolution pyramid of the size numberOfResolutions - jumpSize. |
| tileLength | Typically = 64. Tradeoff between time and coding performance. |
| nTilesX(j) | Number of subband tiles in the x direction at the resolution j |
| nTilesX(j) | Number of subband tiles in the y direction at the resolution j |
| inputColorSpace | Color space of uncompressed original image. |
| outputColorSpace | Transmitted color space used as part of the encoding technique. |

TABLE 7-continued

| Variable | Meaning |
|---|---|
| numberOfcomponents | Number of components in OutputColorSpace. |
| threshold(c,j) | A matrix of values used in lossy compression. The subband coefficients of the component c at the resolution j with absolute value below threshold (c,j) are considered as (visually) insignificant and set to zero. |

Given an input image, the parameters described in Table 7 are computed or chosen. These parameters are also written into a header sent to the client 110 and are used during the progressive rendering step 705 (see section 5.5, described previously). The important parameters to select are:

1. losslessMode: In this mode, progressive transmission of images takes place until lossless quality is obtained. Choosing this mode requires the preprocessing algorithm to use certain reversible wavelet transforms, and can slow down the algorithm.
2. subbandTransformType(j): The (dynamic) selection of wavelet basis (as described, for example, in I. Daubechies, "Ten lectures on wavelets", Siam, 1992) is crucial to the performance of the imaging system. The selection can be non-stationary, meaning a different transform for each resolution j. The selection is derived from the following considerations:
    a. Coding performance (in a rate/distortion sense): This is obviously required from any decent subband/wavelet transform.
    b. Approximation of ideal low pass: It is favorable to choose a transform such that low resolutions of the image will be of high visual quality (some filters produce poor quality low resolutions even before any compression takes place).
    c. Fast transform implementation: Can the associated fast transform be implemented using lifting steps (as described, for example, by I. Daubechies and W. Sweldens, "Factoring wavelet transforms into lifting steps", J. Fourier Anal. Appl., Vol. 4, No. 3, pp. 247–269, 1998), using only integer shifts and additions, etc. Some good examples are the Haar and CDF transforms (1,3), (2,2) described in I. Daubechies, "Ten lectures on wavelets", Siam, 1992.
    d. Fast low pass implementation: A very important parameter, since together with the parameter jumpsize, it determines almost all of the complexity of the algorithm. For example, the CDF (1,3) is in this respect the "optimal" transform with three vanishing moments. Since the dual scaling function is the simple B-spline of order 1, its low pass is simple averaging. Thus, the sequence of CDF transforms, using the B-spline of order 1 as the dual scaling function, but with wavelets with increasing number of vanishing moments are in some sense optimal in the present system. They provide a framework for both real time response and good coding efficiency.
    e. Lossless mode: IflosslessMode is true we must choose the filters from a subclass of reversible transforms (see, for example, "Wavelet transforms that map integers to integers", A. Calderbank, I. Daubechies, W. Sweldens, B. L. Yeo, J. Fourier Anal. Appl., 1998).
    f. Low system I/O: If the network 130 in FIG. 1 connecting between the Image residing on the storage 122 and the imaging server 120 is slow, the bottleneck of the preprocessing stage (and the whole imaging system for that fact) might be simply the reading of the original image. In such a case a transform may be chosen with a lazy sub-sampling low pass filter that corresponds to efficient selective reading of the input image. Many interpolating subband transforms with increasing number of vanishing moments can be selected to suit this requirement. However, this choice should be avoided whenever possible, since it conflicts with (a) and (b).

g. Image type: If the type of the image is known in advance, an appropriate transform can be chosen to increase coding efficiency. For example: Haar wavelet for graphic images, smoother wavelet for real-life images, etc. In the graphic arts field, there are numerous cases of documents composed of low resolution real-life images and high resolution graphic content. In such a case, a non-stationary sequence of transforms may be chosen: Haar for the high resolutions and a smoother basis starting at the highest resolution of a real-life image part. In case of low system I/O (f), a non-stationary choice of interpolating transforms of different orders is required.

3. jumpSize: This parameter controls the tradeoff between fast response to the user's initial request to interact with the image and response times to subsequent ROI requests. When jumpSize is large, the initial response is faster, but each computation of a region of interest with higher resolution than the jump might require processing of a large portion of the original image.

4. outputColorSpace: The following are color spaces which perform well in coding:
   a. Grayscale: For grayscale images
   b. YIQ: for viewing color images
   c. YIQK: for printing CMYK images
   d. Lab: For both viewing and printing, and assuming a color management system exists at the server 120 and client 110 side.
      For example, transforming an RGB to the YIQ color space provides a coding gain of 50%, according to A. Drukarev, "Compression related properties of color spaces", Proc. SPIE Vol. 3024, 1997 and N. Moroney and M. Fairchild, "Color space selection for JPEG image compression", J. Elec. Imaging, Vol. 4(4), pp. 373–381, 1995.

5. threshold (c,j): These parameters control the visual quality in case of lossy compression. The smaller the thresholds, the higher the visual quality. Naturally, the tradeoff is quality for bit-rate. A typical choice for visually lossless quality in the case of a YIQ output color space is described in Table 8 below

TABLE 8

| Resolution/Component | Y | I | Q |
|---|---|---|---|
| j = numberOfResolutions | 6 | 12 | 12 |
| j < numberOfResolutions | 4 | 8 | 8 |

The choice is also derived from the mathematical properties of the pre-chosen subband transform(s).

By padding (adding sufficient rows and columns) each resolution j, an exact tiling is obtained of the multiresolution structure with {nTilesX(j),nTilesY(j)} tiles for each resolution j, each of length tileLength.

6.1.2. Memory Constraint Multiresolution Scan Data Structure

Most wavelet coding algorithms have not addressed the problem of memory complexity. Usually the authors have assumed there is sufficient memory such that the image can be transformed in memory from the time domain to a wavelet frequency domain representation. It seems the upcoming JPEG2000 will address this issue, as did its predecessor JPEG. The preprocessing algorithm also requires performing subband transforms on large images, although not always on the full image, and thus requires careful memory management. This means that the memory usage of the algorithm is not of the order of magnitude of the original image, as described in J. M. Shapiro,"An embedded hierarchical image coder using zero-trees of wavelet coefficients", IEEE Trans. Sig. Proc., Vol. 41, No. 12, pp. 3445–3462, 1993.

Given an uncompressed image we allocate the following number of memory strips $$\text{numberOfComponents} \times (\text{numberOfResolutions} - \text{jumpSize})$$

of sizes $$[2^{-(numberOfResolutions-j)}\text{imageWidth}, 3\times\text{tileLength}/2 + \text{maxFilterSize}]$$

for $1 \leq j \leq \text{numberOfResolutions} - \text{jumpSize} - 1$ and $$[\text{imageWidth}, \text{tileLength} + 2 \times \text{maxFilterSize}]$$

for j=numberOfResolutions−jumpSize

That is, the memory usage is proportional to $2^{-jumpSize} \times$ imageWidth. Each such strip stores low-pass coefficients in the color space outputColorSpace at various resolutions.

Figure 18:
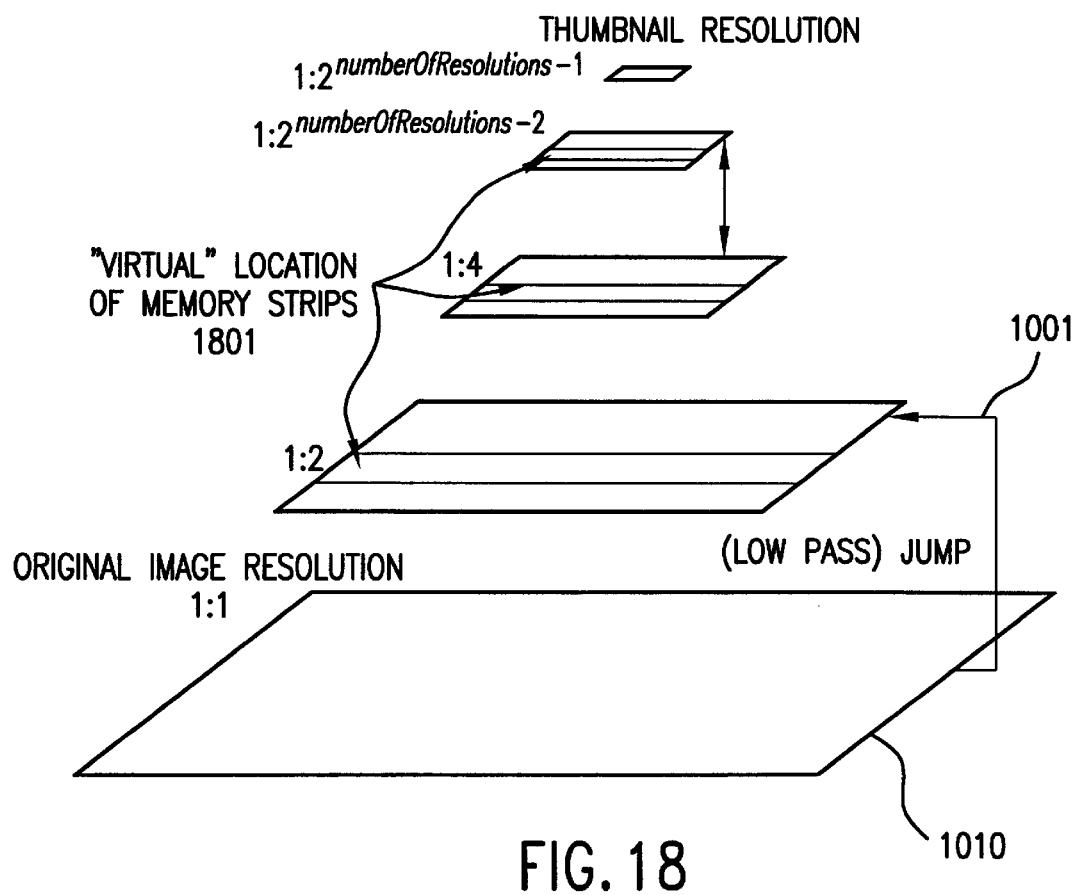
FIG. 18 is a diagram depicting the visualization of the multiresolution memory strip data structure during the preprocessing algorithm.

A snapshot visualization of the multiresolution data structure during the preprocessing algorithm is provided in FIG. 18. Referring to FIG. 9, during the preprocessing stage, the resolutions are scanned simultaneously from start to end in the y direction. For each color component and resolution, the corresponding strip (1801 in FIG. 18) stores low-pass coefficients or pixels at that resolution. The core of the preprocessing algorithm are steps 904–907, where tiles of pixels of length tileLength+2×maxFilterSize are read from the memory strips and handled one at a time. In step 904 the tile is transformed into a tile of length tileLength containing two types of coefficient data: subband coefficients and pixels at a lower resolution. The subband coefficients are processed in steps 905–906 and are stored in the cache. The lower resolution pixels are inserted in step 907 to a lower resolution memory strip. Whenever such a new sub-tile of lower resolution pixels (see section 6.1.9) is inserted into a strip, the algorithm's memory management module performs the following check: If the part of the subtile exceeds the current virtual boundaries of the strip, the corresponding first lines of the strip are considered unnecessary anymore. Their memory is (virtually) re-allocated for the purpose of storing the sub-tile's new data. The pseudo-code of the memory constraint scan algorithm is detailed in FIG. 19.

6.1.3. Step 901: Non-Linear Color Transform

The first step, step 901 is optional. It is only performed in cases where the color conversion from the original uncompressed color space to the compressed color space is a non-linear transformation. A good example is CMYK→YIQ color conversion. The output of this step, which are pixels in the color space outputColorSpace, are not stored, but fed directly to the next step 902.

6.1.4. Step 902: (Subband) Low Pass

Figure 10:
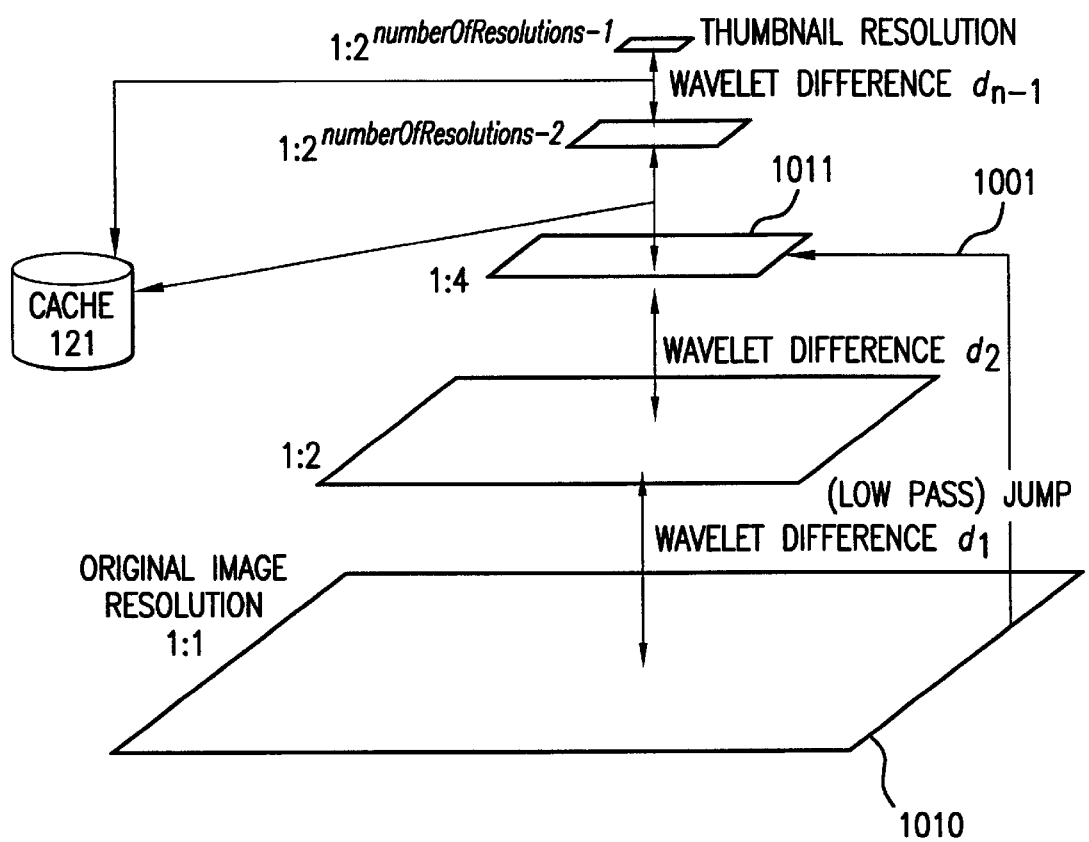
FIG. 10 is a diagram depicting the multiresolution structure used in the reprocessing step.

In step 902, the low pass filters of the transforms subbandTransformType(j), numberOfResolutions− jumpSize<j<numberOfResolutions, are used to obtain a low resolution strip at the resolution numberOfResolutions-jumpSize (as can be seen in FIG. 10). Typically, it is required to low pass about $2^{jumpSize}$ lines of the original image 1010 to produce one line of the low resolution image. The low pass calculation is initiated by a read of tiles of pixels from the memory strips performed in step 904. Whenever there is an attempt to read missing low resolution lines, they are computed by low passing the original image and inserted into the memory strip. As explained in section 6.1.2, the insertion over-writes lines are no longer required, such that the algorithm is memory constrained. In the case where a non-linear color transform took place in the previous step 901, the results of that transform are low-passed. By jumping up the multiresolution ladder (jump 1001 in FIG. 10) to resolution 1011, we avoid computation and storage of high resolution subband coefficients.

For example by choosing jumpSize=2, the main preprocessing stages: (linear) color transform, subband transform, quantization and storing will be done only for a low resolution image that is 16 times smaller than the original image. In case a user views a higher resolution ROI, the server 120 will have to read (again) the associated local area of the original image and perform in step 804 more computations (see section 6.4). Choosing JumpSize=2 means that the length of this local area is bounded by 2×max(widthOfDisplay,heightOfDisplay), which is typically≡1, 400 pixels and small enough for real-time computation. Choosing a bigger jump leads to faster response time assuming the original image can be read from the disk fast enough, but might cause more computations later on.

In a lossy mode, the low pass filtering can be implemented efficiently in integer without paying much attention to round-off errors. In lossless mode (losslessMode =true ), care must be taken to ensure that the result of the low pass step, which are low resolution pixels, can be used in a lossless framework. Specifically, it must be ensured that in a scenario where a user views a low resolution ROI and then zooms into a high resolution ROI, the low resolution data already present at the client side can be used for the rendering such that only the difference between the low resolution and high resolution need to be progressively transmitted until lossless quality is reached. Thus, the low pass is implemented using a special lossless integer-to-integer transform technique, such as that described in "Wavelet transforms that map integers to integers", A. Calderbank, I. Daubechies, W. Sweldens, B. L. Yeo, J. Fourier Anal. Appl., 1998. Unfortunately, this means that this step is slower in lossless mode, due to this special implementation. Nevertheless, it is one of the only ways to provide a fast response to the user's first request to view the image in a true lossless efficient imaging system.

Other less sophisticated solutions include:
1. Transmitting a lossy representation of the image first and a lossless high resolution representation when required, without using the lossy data already sent.
2. Transmitting a lossy representation of the image first and a difference between the lossy representation and the original image whenever lossless quality is required. To compute this difference, the server 120 must simulate the client side 110 and reconstruct the lossy representation.

6.1.5. Step 903: Linear Color Transform

Step 903 is performed whenever the color transform from inputColorSpace to outputColorSpace is a linear operation. In such a case, the color transform is postponed to this stage of the algorithm, although traditionally this is the first step in any transform coding algorithm. The reason for this is that, since the computation of the low pass of step 902 and a linear color transform are commutative, it is much more efficient to first perform low pass filtering in the InputColorSpace domain and only then perform the linear color transform on less pixels.

6.1.6. Step 904: The Subband Transform

In step 904, one step of an efficient local subband transform (FWT) is performed on a tile of pixels at the resolution $1 \leq j \leq$ numberOfResolutions–jumpSize. The type of transform is determined by the parameter subbandTransformType(j). As described in FIG. 20, the transform is performed on an extended tile of pixels of length tileLength+2×maxFilterSize (unless at the boundaries) and is read directly from a multiresolution strip at the resolution j+1. The output of the step is a subband tile (1.2) of length tileLength composed of subband/wavelet coefficients and low resolution coefficients/pixels. The transform step can be efficiently implemented in integers. This saves converting the original pixels to floating-point representation and facilitates the next quantization step. Although the imaging system, as described, can work with any subband/wavelet transform and any implementation, an efficient implementation of a carefully selected transform should have the following properties:

1. Integer implementation using only additions and shifts.
2. Efficient "Lifting Steps" factorizations as explained in I. Daubechies and W. Sweldens, "Factoring wavelet transforms into lifting steps", J. Fourier Anal. Appl., Vol. 4, No. 3, pp. 247–269, 1998.
3. implementation of the two tensor-product steps done at once (see I.

Daubechies, "Ten lectures on wavelets", Siam, 1992). This replaces the traditional implementation of one-dimensional transforms first on rows and then on columns and leads to a better memory management and is faster.

4. The known univariate scaling factors of size $1/\sqrt{2}$ are not implemented. Instead, since a tensor 2D transform is performed, they can be collected to a single scaling factor of 2 and thus implemented using a shift. With careful implementation, even this scaling operation can be avoided by inserting it to the last lifting step.
5. In case an acceleration processor that supports parallel low level computations is present in the server computer 120, it can be used to accelerate this step by paralleling a few lifting Steps.

The subband transform of step 904 outputs two types of coefficients: scaling function (low pass) and wavelet (high pass). The wavelet coefficients are treated in steps 905–906 while the scaling function coefficients are treated in step 907.

Note that tiles of pixels which are located on the boundaries sometimes need to be padded by extra rows and/or columns of pixels, such that they will formulate a full tile of length tileLength.

6.1.7. Step 905: Quantization of Subband Coefficients

In step 905, unless losslessMode is true, the subband coefficients calculated in step 904 are quantized. This procedure is performed at this time for the following reason: It is required that the coefficients computed in the previous step will be stored in the cache 121. To avoid writing huge amounts of data to the cache, some compression is required. Thus, the quantization step serves as a preparation step for the next variable length encoding step. It is important to point out that the quantization step has no effect on compression results. Namely, the quantization step is synchronized with the encoding algorithm described previously in section 4.1, such that the results of the encoding algorithm of quantized and non-quantized coefficients are identical.

A tile of an image component c at the resolution j is quantized using the given threshold threshold (c,j): for each coefficients x, the quantized value is $\lfloor x/threshold(c,j) \rfloor$. It is advantageous to choose the parameters threshold (c,j) to be dyadic such that the quantization can be implemented using integer shifts. The quantization procedure performed on a subband tile is as follows:

1. Initialize maxBitPlane(tile)=0.
2. Loop over each group of four coefficients $\{coef(2 \times i+x, 2 \times j+y)\}_{x,y=0,1}$. For each such group initialize a variable length parameter length (i,j)=0.
3. Quantize each coefficient in the group $coef(2 \times i+x, 2 \times j+y)$ using the appropriate threshold.
4. For each coefficient, update length(i,j) by the bit plane b of the coefficient, where the bit plane is defined by $$|coef(2 \times i+x, 2 \times j+y)| \in [2^b threshold(c,j), 2^{b+1} threshold(c,j))$$

5. After processing the group of four coefficients, use the final value of length(i,j) to update maxBitPlane(tile) by $$maxBitPlane(tile)=max(maxBitPlane(tile), length(i,j))$$

6. At the end of the quantization step, store the value maxBitPlane(tile) in the cache 121.

Note that for subband tiles located at the boundaries we can set to zero subband coefficients that are not associated with the actual image, but only with a padded portion. To do this we take into account the amount of padding and the parameter maxFilterSize. The motivation for the "removal" of these coefficients is coding efficiency.

6.1.8. Step 906: Variable Length Encoding and Storage

In step 906 the coefficients that were quantized in the previous step are variable length encoded and stored in the cache 121. If maxBitPlane(tile)=0 we do not write any data. Else we loop on the coefficient groups $\{coef(2 \times i+x, 2 \times j+y)\}_{x,y=0,1}$. For each such group we first write the group's variable length length(i,j) using $log_2$(maxBitPlane(tile)) bits. Then for each coefficient in the group we write length(i,j)+1 bits representing the coefficient's value. The least significant bit represents the coefficient's sign: if it is 1 then the variable length encoded coefficient is assumed to be negative.

6.1.9. Step 907: Copying Low Pass Coefficients Into the Multiresolution Strip Structure In step 907, the low pass coefficients are inserted into the pyramidal strip data structure at the appropriate location. If the length of the subband tile is tileLength, then the length of the low pass sub-tile is tileLength/2. If the coordinates of the tile are (t_x,t_y,t_resolution), then the coefficients are copied into strip t_resolution−1 at the "virtual" location:

[t_x×tileLength/2,(t_x+1)×tileLength/2]×[t_y×tileLength/2,(t_y+1)×tileLength/2]

As explained in section 6.1.2, these coefficients will be merged into a bigger tile of low resolution pixels and processed later.

6.2. Step 802: Decoding the Request Stream

This is the inverse step of section 5.3. Once the request stream arrives at the server 120, it is decoded back to a data block request list. Each data structure of type (1.3) representing a group of requested data blocks is converted to the sub-list of these data blocks.

6.3. Step 803: Encoding Low Resolution Part of ROI

Figure 11:
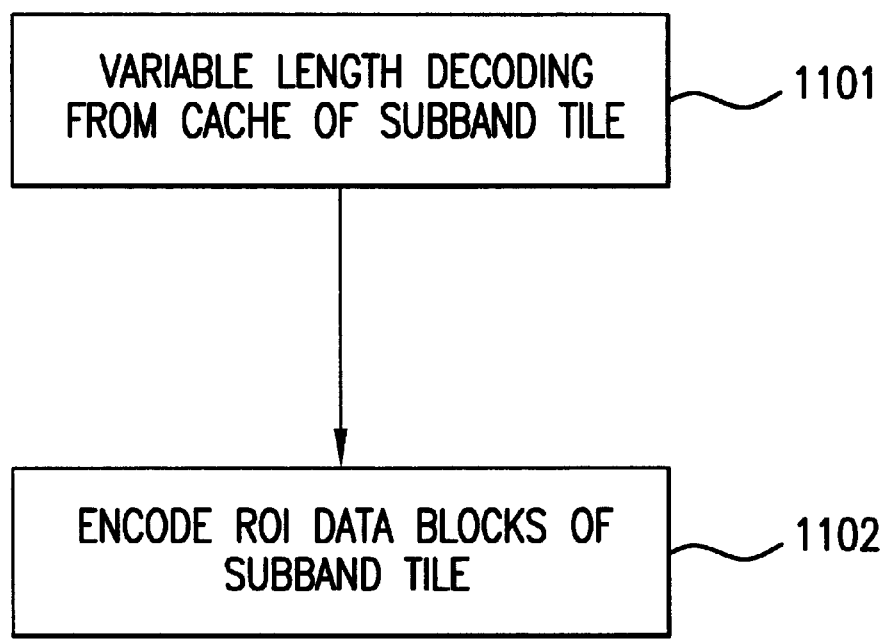
FIG. 11 is a flow diagram describing low resolution encoding.

Step 803 is described in FIG. 11. It is only performed whenever the data blocks associated with a low resolution subband tile are not available in the server cache 121.

Step 1101 is the inverse step of step 906 described in section 6.1.8. In the preprocessing algorithm, subband tiles of lower resolution—that is resolutions lower than numberOfResolutions–jumpSize—are stored in the cache using a variable length type algorithm. For such a tile, the variable length representation is first decoded. The algorithm uses the stored value maxBitPlane(tile). If maxBitPlane(tile)=0, then all the coefficients are set to zero. Else the following simple decoding algorithm is performed:

1. For each group of four coefficients $\{coef(2 \times i+x, 2 \times j+y)\}_{x,y=0,1}$, $log_2$(maxBitPlane(tile)) bits are read representing the variable length of the group.
2. Assume the variable length is length(i,j). For each of the four coefficients, length(i,j)+1 bits are read. The least significant bit represents the sign. The reconstructed coefficient takes the value:

$$threshold \times (readBits \gg 1) \times \begin{cases} -1 & readBits \,\&\, 1 = 1 \\ 1 & readBits \,\&\, 1 = 0 \end{cases}$$

In step 1102 the encoding algorithm is used, described in section 4.1 to encode the requested data blocks (1.2) associated with the extracted quantized subband tile. Observe that in lossy mode the encoding algorithm is using quantized coefficients read from the cache instead of the original coefficients. Nevertheless, this has no effect on the encoding algorithm since the quantization procedure 905 removed from each coefficient precision data that is not encoded.

6.4. Step 804: Processing High Resolution Part of ROI

Figure 12:
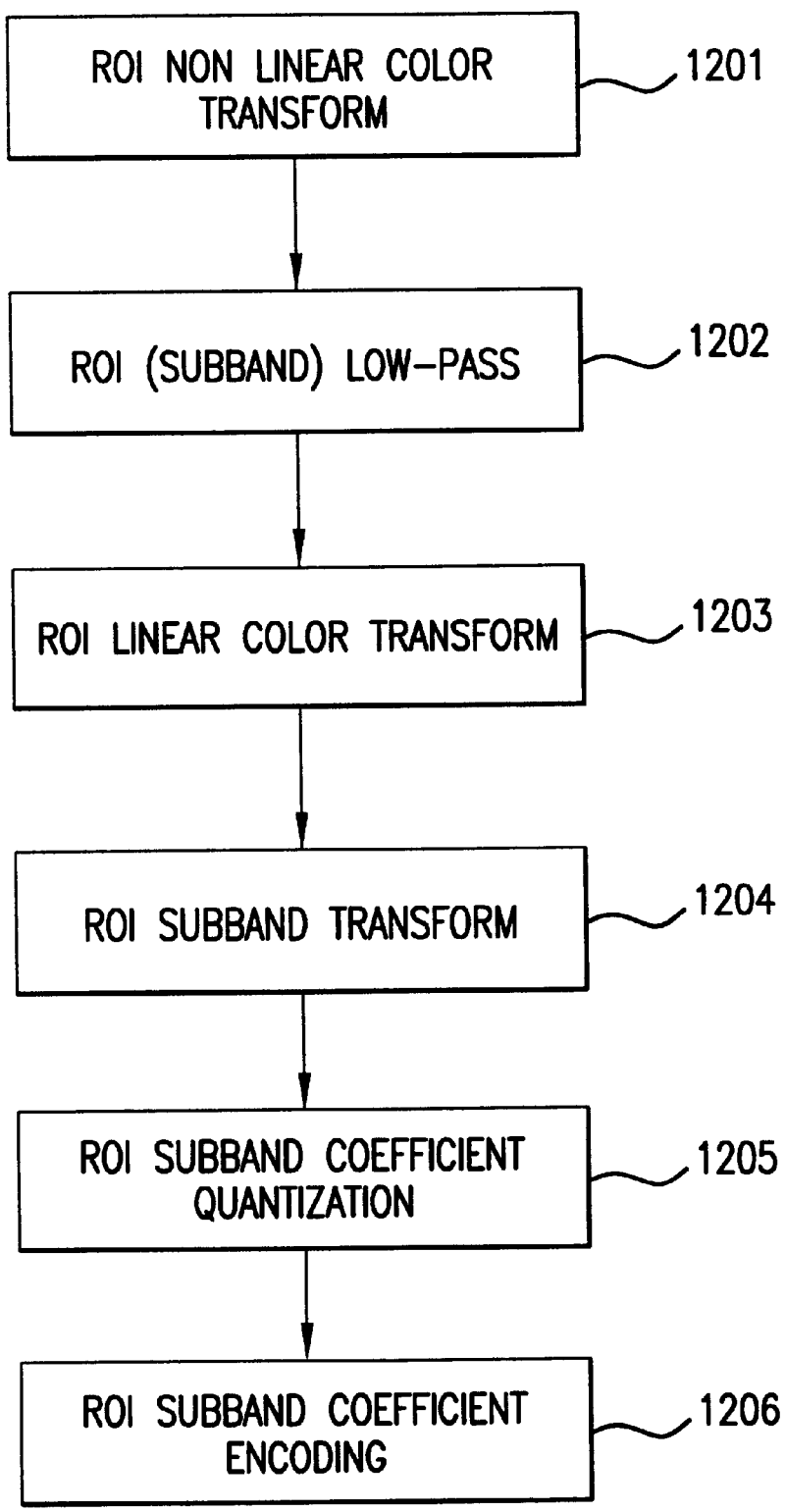
FIG. 12 is a flow diagram describing region of interest high resolution processing.

Step 804 is described in FIG. 12. In case we have used jumpSize>0 in step 801 and the resolution of the ROI>numberOfResolutions–jumpSize, we are sometimes required to perform a local variation of the preprocessing step, described in section 6.1. Whenever the server 120 receives a request list of data, the following is checked. If a data block has been previously computed (present in the cache 121) or is associated with a low resolution subband tile data block, then it is either simply read from the cache or handled in step 803. Else, the coordinates of the data block are used in the same manner as step 704 (see section 5.4) to find the minimal portion of the ROI that needs to be processed. Then, a local version of the preprocessing algorithm is performed for this local portion. The difference here is that step 1026 replaces Variable Length coding steps 905–906 of the preprocessing algorithm by the encoding algorithm provided in section 4.1.

6.5. Step 805: Progressive Transmission of ROI

In the final step, the encoded data tiles are sent from the server 120 to the client 110, in the order they were requested.

In many cases, data blocks will be empty. For example, for a region of the original image with a constant pixel value, all of the corresponding data blocks will be empty, except for the first one which will contain only one byte with the value zero representing maxBitPlane(tile)=0. For a low activity region of the image, only the last data blocks representing higher accuracy will contain any data. Therefore, to avoid the extra side information, rectangles of empty data blocks are collected and reported to the client 110 using a structure of type (1.3) under the restriction that they are reported in the order in which they were requested. For blocks containing actual data, only the data block's size in bytes need be reported, since the client 110 already knows which data blocks to expect and in which order.

The present invention has been described in only a few embodiments, and with respect to only a few applications (e.g., commercial printing and medical imaging). Those of ordinary skill in the art will recognize that the teachings of the present invention may be used in a variety of other applications where images are to be transmitted over a communication media.

What is claimed is:

1. A system for transmitting a digital image over a communication network, comprising:
   (a) an image storage device for storing an original digital image at an original resolution;
   (b) a client computer coupled to the communication network, wherein the client computer generates at least one request for interaction with the original digital image and at least one subsequent request, each identifying a region of interest at a selected resolution within the original digital image;
   (c) a server computer coupled to the communication network and the storage device, the server computer performing the steps of:
      (i) pre-processing the original digital image in response to the receipt of the first request, the pre-processed digital image having a resolution lower than or equal to the original resolution;
      (ii) for each subsequent request received from the client computer:
         (A) compressing the region of interest associated with each request, based upon:
            (1) the pre-processed digital image, and
            (2) further processing of portions of the original digital image at the selected resolution of the region of interest identified in the subsequent request; and
         (B) progressively transmitting the compressed region of interest to the client computer via the communication network.

2. The system of claim 1, wherein the client computer progressively performs the steps of:
   (i) decompressing the compressed region of interest transmitted from the server computer; and
   (ii) rendering the decompressed region of interest.

3. The system of claim 2, wherein the client computer renders the decompressed region of interest onto a video display.

4. The system of claim 2, wherein the client computer renders the decompressed region of interest onto a printer.

5. The system of claim 2, wherein the client computer performs the initial step of storing the compressed region of interest in a cache associated with the client computer.

6. The system of claim 5, wherein the client computer only requests that portion of a region of interest that was not previously stored in the cache.

7. The system of claim 1, wherein the region of interest is transmitted from the server computer to the client computer using encoded data blocks having X, Y, resolution and accuracy dimensions.

8. The system of claim 1, wherein the client computer may request the digital image from the server computer in a progressive mode selected from the list of: resolution, accuracy and spatial.

9. The system of claim 1, wherein the pre-processing step performed by the server comprises the sub-steps of:
   (A) generating a lower resolution digital image from the original digital image, reading the original digital image from the image storage device;
   (B) color transforming the lower resolution digital image to a compression color space;
   (C) transforming the compression color space digital image into wavelet coefficients;
   (D) performing quantization on the wavelet coefficients; and
   (E) storing the quantified wavelet coefficients in a storage device associated with the server computer.

10. The system of claim 9, wherein the transforming sub-step converts the digital image from its original color space to a compression color space, and the client computer converts the digital image from the compression color space to a rendering color space.

11. The system of claim 1, wherein the pre-processing step utilizes constrained memory with an order of magnitude of the square root of the original digital image size.

12. The system of claim 1, wherein the compressing step utilizes the non-zero-trees type of progressive encoding technique.

13. The system of claim 1, wherein in the compressing step, the server computer fully compresses the region of interest.

14. The system of claim 1, wherein in the compressing step, the server partially compresses the region of interest.

15. The system of claim 1, wherein the progressive transmitting step comprises the sub-steps of:
   (1) transmitting the compressed region of interest within the selected digital image at a relatively low resolution; and
   (2) transmitting the compressed region of interest within the selected digital image at successively higher resolutions.

16. The system of claim 1, wherein the progressive transmitting step comprises the sub-steps of:
   (1) transmitting the compressed region of interest within the selected digital image at a relatively low level of accuracy; and
   (2) transmitting the compressed region of interest within the selected digital image at successively higher levels of accuracy.

17. The system of claim 1, wherein the progressive transmitting step comprises the sub-steps of:
   (1) transmitting a first band of the compressed region of interest within the selected digital image in spatial order starting from the top; and
   (2) repeating the transmission of the rest of the bands of the compressed region of interest within the selected digital image in spatial order.

18. A system for transmitting a digital image over a communication network, comprising:
   (a) an image storage device for storing an original digital image;

(b) a client computer coupled to the communication network, wherein the client computer generates at least one request, each request identifying a region of interest within the original digital image;

(c) a server computer coupled to the communication network and the storage device, the server computer performing the steps of:
  (i) receiving a first request from the client computer;
  (ii) pre-processing the original digital image in response to the receipt of the first request;
  (iii) for each subsequent request received from the client computer:
    (A) compressing the region of interest associated with each subsequent request, based upon the pre-processed digital image; and
    (B) progressively transmitting the compressed region of interest to the client computer via the communication network.

19. The system of claim 18, wherein the client computer progressively performs the steps of:
  (i) decompressing the compressed region of interest transmitted from the server computer; and
  (ii) rendering the decompressed region of interest.

20. The system of claim 19, wherein the client computer renders the decompressed region of interest onto a video display.

21. The system of claim 19, wherein the client computer renders the decompressed region of interest onto a printer.

22. The system of claim 19, wherein the client computer performs the initial step of storing the compressed region of interest in a cache associated with the client computer.

23. The system of claim 22, wherein the client computer only requests that portion of a region of interest that was not previously stored in the cache.

24. The system of claim 18, wherein the region of interest is transmitted from the server computer to the client computer using encoded data blocks having X, Y, resolution and accuracy dimensions.

25. The system of claim 18, wherein the client computer may request the digital image from the server computer in a progressive mode selected from the list of: resolution, accuracy and spatial.

26. The system of claim 18, wherein the pre-processing step performed by the server comprises the sub-steps of:
  (A) reading the original digital image from the image storage device;
  (B) color transforming the lower resolution digital image to a compression color space;
  (C) transforming the compression color space digital image into wavelet coefficients;
  (D) performing quantization on the wavelet coefficients; and
  (E) storing the quantified wavelet coefficients in a storage device associated with the server computer.

27. The system of claim 26, wherein the transforming sub-step converts the digital image from its original color space to a compression color space, and the client computer converts the digital image from the compression color space to a rendering color space.

28. The system of claim 18, wherein the pre-processing step utilizes constrained memory with an order of magnitude of the square root of the original digital image size.

29. The system of claim 18, wherein the compressing step utilizes the non-zero-trees type of progressive encoding technique.

30. The system of claim 18, wherein in the compressing step, the server computer fully compresses the region of interest.

31. The system of claim 18, wherein in the compressing step, the server partially compresses the region of interest.

32. The system of claim 18, wherein the progressive transmitting step comprises the sub-steps of:
  (1) transmitting the compressed region of interest within the selected digital image at a relatively low resolution; and
  (2) transmitting the compressed region of interest within the selected digital image at successively higher resolutions.

33. The system of claim 18, wherein the progressive transmitting step comprises the sub-steps of:
  (1) transmitting the compressed region of interest within the selected digital image at a relatively low level of accuracy; and
  (2) transmitting the compressed region of interest within the selected digital image at successively higher levels of accuracy.

34. The system of claim 18, wherein the progressive transmitting step comprises the sub-steps of:
  (1) transmitting a first band of the compressed region of interest within the selected digital image in spatial order starting from the top; and
  (2) repeating the transmission of the rest of the bands of the compressed region of interest within the selected digital image in spatial order.

35. The system of claim 18, wherein the pre-processing step performed by the server comprises the sub-steps of:
  (A) reading the original digital image from the image storage device;
  (B) color transforming the original digital image to a compression color space;
  (C) transforming the compression color space digital image into wavelet coefficients;
  (D) performing quantization on the wavelet coefficients; and
  (E) storing the quantified wavelet coefficients in a storage device associated with the server computer.

36. A system for transmitting a digital image over a communication network, comprising:
  (a) an image storage device for storing an original digital image;
  (b) a client computer coupled to the communication network, wherein the client computer generates at least one request, each request identifying a region of interest within the original digital image;
  (c) a server computer coupled to the communication network and the storage device, the server computer performing the steps of:
    (i) receiving a first request from the client computer;
    (ii) pre-processing the original digital image in response to the receipt of the first request;
    (iii) for each subsequent request received from the client computer:
      (A) compressing the region of interest associated with each subsequent request, based upon the pre-processed digital image; and
      (B) transmitting the compressed region of interest to the client computer via the communication network.

37. A server computer for transmitting a digital image to a client computer over a communication network, the server computer being coupled to an image storage device for storing an original digital image at an original resolution, wherein the client computer generates at least one request for interaction with the original digital image and at least one subsequent request, each identifying a region of interest at a selected resolution within the original digital image, the server computer comprising:
- (a) means for pre-processing the original digital image in response to the receipt of the first request, the pre-processed digital image having a resolution lower than or equal to the original resolution;
- (b) means, for each subsequent request received from the client computer, for:
  - (i) compressing the region of interest associated with each request, based upon:
    - (1) the pre-processed digital image, and
    - (2) further processing of portions of the original digital image at the selected resolution of the region of interest identified in the subsequent request; and
  - (ii) progressively transmitting the compressed region of interest to the client computer via the communication network.

38. A server computer for transmitting a digital image to a client computer over a communication network, the server computer being coupled to an image storage device for storing an original digital image, wherein the client computer generates at least one request, each request identifying a region of interest within the original digital image, the server computer comprising:
- (a) means for receiving a first request from the client computer;
- (b) means for pre-processing the original digital image in response to the receipt of the first request;
- (c) means, for each subsequent request received from the client computer, for:
  - (i) compressing the region of interest associated with each subsequent request, based upon the pre-processed digital image; and
  - (ii) progressively transmitting the compressed region of interest to the client computer via the communication network.

39. A method for transmitting a digital image from an image storage device to a client computer over a communication network, comprising the steps of:
- (a) storing an original digital image at an original resolution in the image storage device;
- (b) generating at the client computer at least one request for interaction with the original digital image and at least one subsequent request, each request identifying a region of interest at a selected resolution within the original digital image;
- (c) pre-processing the original digital image in response to the receipt of the first request, the pre-processed digital image having a resolution lower than or equal to the original resolution;
- (d) for each subsequent request received from the client computer:
  - (i) compressing the region of interest associated with each request, based upon:
    - (1) the pre-processed digital image, and
    - (2) further processing of portions of the original digital image at the selected resolution of the region of interest identified in the subsequent request; and
  - (ii) progressively transmitting the compressed region of interest to the client computer via the communication network.

40. A method for transmitting a digital image to a client computer over a communication network, comprising the steps of:
- (a) storing an original digital image;
- (b) generating at the client computer at least one request, each request identifying a region of interest within the original digital image;
- (c) receiving a first request from the client computer;
- (d) pre-processing the original digital image in response to the receipt of the first request;
- (e) for each subsequent request received from the client computer:
  - (i) compressing the region of interest associated with each subsequent request, based upon the pre-processed digital image; and
  - (ii) progressively transmitting the compressed region of interest to the client computer via the communication network.

41. A computer-readable media for a server computer, programmed to cause the server computer to transmit a digital image to a client computer over a communication network, the server computer being coupled to an image storage device for storing an original digital image at an original resolution, wherein the client computer generates at least one request for interaction with the original digital image and at least one subsequent request, each identifying a region of interest at a selected resolution within the original digital image, the computer-readable media programmed to performed the steps of:
- (a) pre-processing the original digital image in response to the receipt of the first request, the pre-processed digital image having a resolution lower than or equal to the original resolution;
- (b) for each subsequent request received from the client computer:
  - (i) compressing the region of interest associated with each request, based upon:
    - (1) the pre-processed digital image, and
    - (2) further processing of portions of the original digital image at the selected resolution of the region of interest identified in the subsequent request; and
  - (ii) progressively transmitting the compressed region of interest to the client computer via the communication network.

42. A computer-readable media for a server computer, programmed to cause the server computer to transmit a digital image to a client computer over a communication network, the server computer being coupled to an image storage device for storing an original digital image, wherein the client computer generates at least one request, each request identifying a region of interest within the original digital image, the computer-readable media programmed to perform the steps of:
- (a) receiving a first request from the client computer;
- (b) pre-processing the original digital image in response to the receipt of the first request;
- (c) for each subsequent request received from the client computer:
  - (i) compressing the region of interest associated with each subsequent request, based upon the pre-processed digital image; and
  - (ii) progressively transmitting the compressed region of interest to the client computer via the communication network.

* * * * *